(12) United States Patent
Kawk et al.

(10) Patent No.: US 11,206,450 B2
(45) Date of Patent: Dec. 21, 2021

(54) SYSTEM, APPARATUS AND METHOD FOR PROVIDING SERVICES BASED ON PREFERENCES

(71) Applicant: LG ELECTRONICS INC., Seoul (KR)

(72) Inventors: Dae Woo Kawk, Bucheon-si (KR); Youn Hee Kim, Seoul (KR); Kyung Jun Park, Goyang-si (KR); Byung June Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 216 days.

(21) Appl. No.: 16/584,265

(22) Filed: Sep. 26, 2019

(65) Prior Publication Data

US 2020/0021886 A1    Jan. 16, 2020

(30) Foreign Application Priority Data

Aug. 26, 2019    (KR) ........................ 10-2019-0104623

(51) Int. Cl.
*H04N 21/442*    (2011.01)
*H04N 21/466*    (2011.01)
(Continued)

(52) U.S. Cl.
CPC ... *H04N 21/44218* (2013.01); *G06K 9/00275* (2013.01); *G06K 9/00315* (2013.01);
(Continued)

(58) Field of Classification Search
None
See application file for complete search history.

(56) References Cited

U.S. PATENT DOCUMENTS 10,171,877 B1 *   1/2019   Shah ................... H04N 21/812
11,043,230 B1 *   6/2021   Riding .................... G10L 25/63
(Continued)

FOREIGN PATENT DOCUMENTS

KR    10-2016-0056454 A    5/2016
KR       10-1875230 B1     8/2018

OTHER PUBLICATIONS

U.S. Appl. No. 62/809,507. (Year: 2019).*

*Primary Examiner* — Junior O Mendoza
(74) *Attorney, Agent, or Firm* — Birch, Stewart, Kolasch & Birch, LLP

(57) ABSTRACT

Disclosed is a preference-based service providing method for operating preference-based service providing system and device by executing an artificial intelligence (AI) algorithm and/or a machine learning algorithm in a 5G environment connected for the Internet of things. A preference-based service providing method according to an embodiment of the present disclosure may include acquiring user video information obtained by imaging a user who is using an electronic device, analyzing a preference of the user for a service provided by the electronic device on the basis of the user video information including a face image and a posture image of the user, setting a priority of the service provided by the electronic device on the basis of the preference of the user, and providing a recommendation list of services provided by the electronic device on the basis of priorities of the services.

18 Claims, 12 Drawing Sheets

(51) Int. Cl.
*G06K 9/00* (2006.01)
*H04N 21/4223* (2011.01)

(52) U.S. Cl.
CPC ..... *G06K 9/00342* (2013.01); *H04N 21/4223* (2013.01); *H04N 21/44222* (2013.01); *H04N 21/4668* (2013.01); *G06K 2009/00322* (2013.01)

(56) References Cited

U.S. PATENT DOCUMENTS

| | | | |
|---|---|---|---|
| 2012/0227063 A1* | 9/2012 | Tsurumi | H04N 21/6582 725/10 |
| 2016/0182955 A1* | 6/2016 | Klappert | H04N 21/44204 725/14 |
| 2019/0268660 A1* | 8/2019 | el Kaliouby | G06K 9/627 |
| 2020/0169789 A1* | 5/2020 | Kim | H04N 21/4532 |
| 2020/0213649 A1* | 7/2020 | Tillette De Clermont-Tonnerre | H04N 21/4826 |
| 2020/0273485 A1* | 8/2020 | Jagmag | H04N 21/4667 |

* cited by examiner

FIG. 6

| CONTENT TYPE OR SERVICE TYPE | Emotion (0.5) | Attention (0.4) | Gender/Age (0.1) | Attraction (1) |
|---|---|---|---|---|
| A | 0.1 | 0.5 | 0.5 | 0.3 |
| B | 0.5 | 0.5 | 0.5 | 0.5 |
| C | 0.9 | 0.9 | 0.5 | 0.86 |

FIG. 9
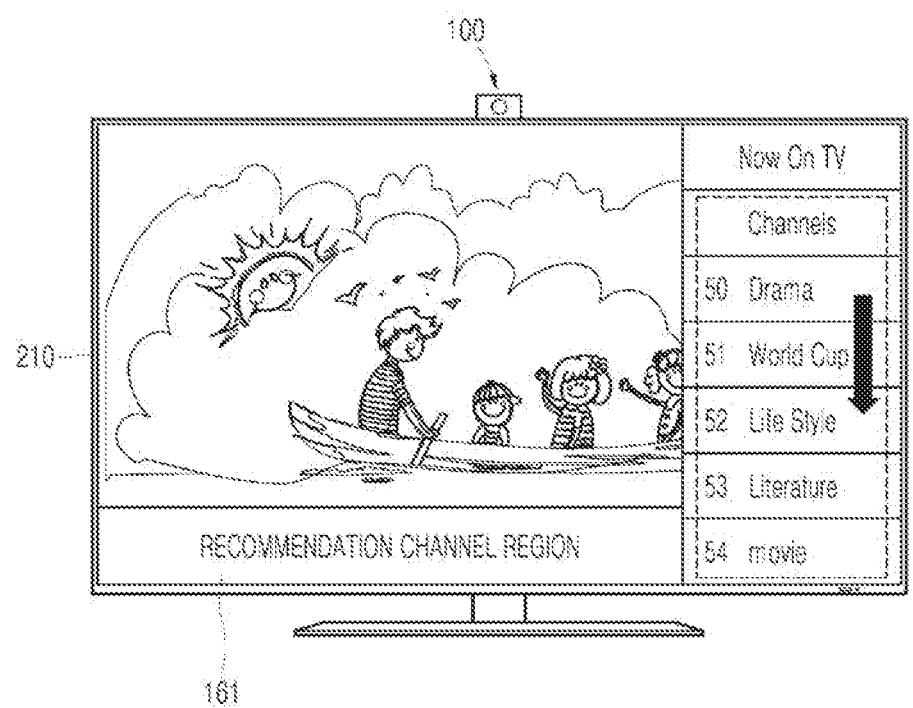
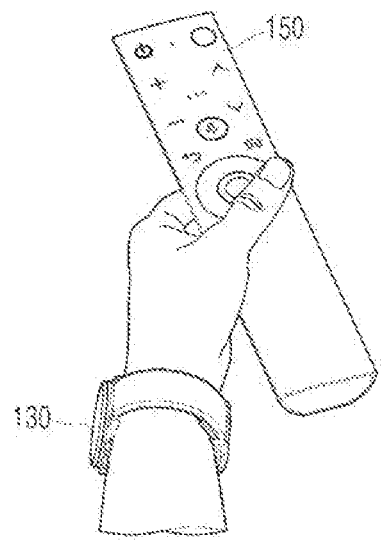

SYSTEM, APPARATUS AND METHOD FOR PROVIDING SERVICES BASED ON PREFERENCES

CROSS-REFERENCE TO RELATED APPLICATION

This present application claims benefit of priority to Korean Patent Application No. 10-2019-0104623, entitled "SYSTEM, APPARATUS AND METHOD FOR PROVIDING SERVICES BASED ON PREFERENCES," filed on Aug. 26, 2019, in the Korean Intellectual Property Office, the entire disclosure of which is incorporated herein by reference.

BACKGROUND

1. Technical Field

The present disclosure relates to a system, apparatus, and method for providing a preference-based service, and more particularly, to a system, apparatus, and method for providing a preference-based service, which enable an electronic device service to be provided on the basis of a user' preference that is analyzed on the basis of face information of a user who uses an electronic device.

2. Description of Related Art

It is a recent trend that analog broadcasting is globally switched into digital broadcasting. Unlike the analog broadcasting environment, various pieces of broadcast data are transmitted through tens to hundreds of channels in the digital broadcasting environment. For example, an Internet protocol television (IPTV) or smart TV service, which is a type of a digital TV service, provides the interactivity that allows a user to actively select a type of a watching program, a watching time, or the like.

Related art 1 discloses a method for inferring a preference using watching information and metadata, in which broadcast genres are stratified according to user's preferences and then a user's preference for each stratified genre is provided to a broadcaster or an advertiser.

In other words, related art 1 is characterized in that content can be recommended to the user on the basis of a watching frequency and a watching history of content that the user has watched. However, for related art 1, it is difficult to extract an accurate preference, because the emotion, attention, or the like of a user using the content is hardly comprehended.

Related art 2 discloses a method for tracking and analyzing a user' interest using a front camera, in which an image is acquired from the front camera in an IT device and user's line of sight information (a gazing time, or a gazing order) is analyzed from the image to recommend a service suitable for a user's taste to the user.

In other words, related art 2 is characterized in that a user's interest is tracked and analyzed using the front camera to recommend a service suitable for the user's interest to the user. However, since the user's interest is tracked and analyzed on the basis of the user's line of sight, without other user information such as information on the user's posture being reflected, there is an issue in that the accuracy of the analysis for the user's interest is low.

The above-described background technology is technical information that the inventors hold for the derivation of the present disclosure or that the inventors acquired in the process of deriving the present disclosure. Thus, the above-described background technology cannot be regarded as known technology disclosed to the general public prior to the filing of the present application.

RELATED ART DOCUMENTS

Patent Documents (Patent document 1) Korean Patent Registration No. 10-1875230 (Registration on Jun. 29, 2018)
(Patent document 2) Korean Unexamined Patent Application Publication No. 10-2016-0056454 (publication on May 20, 2016)

SUMMARY OF THE INVENTION

An aspect of the present disclosure is to provide an electronic device service on the basis of a user's preference analyzed on the basis of face information of a user who uses an electronic device, and thus to reflect user's satisfaction and enable the user to use the best service.

Another aspect of the present disclosure is to track and analyze face information of a user who uses an electronic device, and to provide a user-customized preference service so as to improve the performance of a preference-based service providing apparatus.

Another aspect of the present disclosure is to recommend and provide a preference-based service, when power of an electronic device is driven or an electronic device service is requested, and thus to solve inconvenience that the user searches for a desired service every time.

Another aspect of the present disclosure is to make a preference-based service providing apparatus applicable to any electronic device provided with a camera, and thus to improve product utilization and economics thereof.

Another aspect of the present disclosure is to improve the reliability of a preference-based service providing apparatus by applying gender and age information to an analysis of a user's preference.

Another aspect of the present disclosure is to provide a user-customized service in correspondence to a user's emotion at the time of requesting a service, and thus to improve a communication performance of a preference-based service providing apparatus.

Another aspect of the present disclosure is to improve product use satisfaction of a user by setting a priority with not only face information of a user but also at least one of history information or bio-signal information reflected thereto.

Another aspect of the present disclosure is to improve the performance of a preference-based service providing apparatus by allowing preference-based priorities of services provided by an electronic device to be more accurately set using an artificial intelligence and/or machine learning algorithm.

Objects of the embodiments of the present disclosure are not limited to the aspects described above. Other objects and advantages of the present disclosure can be understood by the following description, and become apparent with reference to the embodiments of the present disclosure. Furthermore, it will be understood that aspects and advantages of the present disclosure may be achieved by the means set forth in claims and combinations thereof.

A preference-based service providing method according to an embodiment of the present disclosure may include providing a service of an electronic device on the basis of a user's preference analyzed based on face information of the user who uses the electronic device.

In detail, a preference-based service providing method includes: acquiring user video information obtained by imaging a user who is using an electronic device; analyzing a preference of the user for a service provided by the electronic device on a basis of the user video information including a face image and a posture image of the user; setting a priority of the service provided by the electronic device on a basis of the preference of the user; and providing a recommendation list of services provided by the electronic device on a basis of priorities of the services.

Through the preference-based service providing method according to an embodiment of the present disclosure, the service of the electronic device may be provided based on the preference of the user who actually uses the electronic device, and thus a user-customized best service on which user's satisfaction is reflected may be provided.

In addition, the analyzing of the preference of the user may include: extracting the face image and the posture image of the user from the user video information; and analyzing the face image and the posture image of the user to extract user characteristic information including at least one of an emotions state, an attention, or an age and a gender.

In addition, the analyzing of the preference of the user may include: digitizing each piece of the user characteristic information; adding up an average value of each piece of the user characteristic information during a prescribed time period; and deriving a result of adding up the average value of each piece of the user characteristic information as the preference of the user.

In addition, the analyzing of the preference of the user may include: extracting the face image and the posture image of the user from the user video information; using a first deep neural network model to derive the emotional state of the user on a basis of the extracted face image; using a second deep neural network model to derive the attention of the user on a basis of the extracted posture image; and analyzing the preference of the user on a basis of the derived emotional state and attention of the user, wherein the first deep neural network has been already trained so as to estimate an emotional state of a human according to a face image of the human, and the second deep neural network has been already trained so as to estimate an attention of the human according to a posture image of the human.

The setting of the priority may include: setting the priority in order of high preference of the user.

Through the analyzing of the user's preference and the setting of the priority according to an embodiment of the present disclosure, the face information of the user using an electronic device is tracked and analyzed to enable the user-customized preference service to be provided so as to improve a product performance, and gender and age information may be applied to an user' preference analysis to enable diversification of functions of the product.

The preference-based service providing method according to an embodiment of the present disclosure may further include: receiving a request for the service provided by the electronic device from the user; acquiring the user video information obtained by imaging the user at a time of the request; and analyzing the emotional state of the user on a basis of the user video information at the time when the service is requested.

Through the preference-based service providing method according to an embodiment of the present disclosure, preference-based priorities of the services of the electronic device are enabled to be more accurately set using an artificial intelligence and/or a machine learning algorithm, and thus a communication performance of the preference-based service providing apparatus may be improved.

The setting of the priority may include: acquiring first history information including a history that the service is selected from among the recommendation list of the services provided by the electronic device according to the priority setting based on the preference of the user, and second history information including a history that the service provided by the electronic device is selected or set by a manual operation of the user; and reflecting the first history information and the second history information to readjust the priority.

In addition, the acquiring of the first history information and the second history information may include acquiring at least one of a selection or setting accumulation value, a use time accumulation value, or a number of change accumulation value for the service provided by the electronic device, which are included in the first history information and the second history information.

Through the setting of the priority and the acquiring of the first history information and the second history information according to an embodiment of the present disclosure, not only the face information of the user but also the history information are reflected to set the priorities, and thus user's product use satisfaction may be improved.

The preference-based service providing method according to an embodiment of the present disclosure may further include acquiring bio-signal information of the user who is using the electronic device, wherein the analyzing of the preference of the user includes analyzing the preference of the user for the service provided by the electronic device on the basis of the user video information including the face image and the posture image of the user, and the bio-signal information of the user.

Through the preference-based service providing method, by using user information acquired via both a camera and a function of the electronic device itself, the user's preference can be analyzed on the basis of more diverse data. Therefore, the product accuracy and utilization may be improved.

In addition, the preference-based service providing method according to an embodiment of the present disclosure may include: receiving, as input data, the first history information including the service being provided by the electronic device, environment information at the time when the service is provided, the user's emotional state analyzed on a basis of the user video information at the time when the user requests for the service, a user's preference derivation result at the time of using the service being provided, a history that the service has been selected from among the recommendation list of the services provided by the electronic device by means of a priority setting based on the user's preference, the second history information including a history that the service provided by the electronic device has been selected or set by a user's manual operation signal, and user's bio-signal information; applying the received input data to a learning model for generating the recommendation list of the services provided by the electronic device according to an analysis result of the user's preferences; and outputting preference-based service recommendation list data from the learning model, wherein the learning model is trained so as to generate the recommendation list of the services provided by the electronic device according to the priorities setting on a basis of a plurality of pieces of input data which has been already received and the analysis result of the user's preferences that have been already calculated in correspondence to the respective piece of the input data for generating the recommendation list of the services provided by the electronic device.

A preference-based service providing apparatus according to an embodiment of the present disclosure may include: an acquirer for acquiring user video information obtained by imaging the user who is using an electronic device; an analyzer for analyzing a preference of the user for a service provided by the electronic device on a basis of the user video information including a face image and a posture image of the user; a priority setter for setting a priority of the service provided by the electronic device on a basis of the preference of the user; and a provider for providing a recommendation list of services provided by the electronic device on a basis of priorities of the services.

Through the preference-based service providing apparatus according to an embodiment of the present disclosure, when power of the electronic device is driven or a providing service is requested, a preference-based service is recommended and provided, and thus inconvenience that the user searches for a desired service every time may be solved.

The preference-based service providing apparatus according to an embodiment of the present disclosure may further include: a face extractor for extracting the face image and the posture image of the user from the user video information; and a user characteristic extractor for analyzing the face image and the posture image of the user to extract user characteristic information including at least one of an emotional state, an attention, or an age and a gender.

In addition, the analyzer may digitize each piece of the user characteristic information to add up an average value of each piece of the user characteristic information during a certain period of time, and derive the added up result of the average of each of the user characteristic information as the preference of the user.

In addition, the priority setter may set the priority in order of high preference of the user.

Through the user characteristic extractor, the analyzer, and the priority setter according to an embodiment of the present disclosure, the service of the electronic device is provided on the basis of the user's preference analyzed based on the face information of the user who uses the electronic device, and thus satisfaction of the actual user may be reflected. Furthermore, the face information of the user who uses the electronic device is tracked and analyzed to be able to provide a user-customized preference service so as to improve a product performance.

When a request for the service provided by the electronic device is received from the user, the acquirer may acquire the user video information obtained by imaging the user at the time of the request, and the analyzer may analyze an emotional state of the user on a basis of the user video information at the time when the service is requested.

Through the acquirer according to an embodiment of the present disclosure, since a user's emotion is comprehended at a time of requesting for a service provided by the electronic service and the service corresponding to the user's emotion is provided, a communication performance of the preference-based service providing apparatus may be improved.

The preference-based service providing apparatus according to an embodiment of the present disclosure may further include: a history acquirer for acquiring the first history information including a history that the service is selected from among the recommendation list of the services provided by the electronic device according to the priority setting based on the preferences of the user, and the second history information including a history that the service provided by the electronic device is selected or set by a manual operation of the user, wherein the priority setter reflects the first history information and the second history information to readjust the priorities.

In addition, the history acquirer may acquire at least one of a selection or setting accumulation value, a use time accumulation value, or a number of change accumulation value for the service provided by the electronic device, which are included in the first history information and the second history information.

Through the history acquirer and the priority setter according to an embodiment of the present disclosure, the performance of the preference-based service providing apparatus may be improved by enabling the preference-based priority of the service provided by the electronic device to be more accurately set using the artificial intelligence and/or machine learning algorithm.

In addition, the preference-based service providing apparatus according to an embodiment of the present disclosure may further include: a bio-signal receiver for acquiring bio-signal information of the user who is using the electronic device, wherein the analyzer analyzes the preference of the user for the service provided by the electronic device on the basis of the user video information including the face image and the posture image of the user, and the bio-signal information of the user.

Through the preference-based service providing apparatus according to an embodiment of the present disclosure, not only the face information of the user, but also at least one of the history information or the bio-signal information are reflected to set the priority, and thus user's product use satisfaction may be improved.

A preference-based service providing apparatus according to an embodiment of the present disclosure may further include: a learning input interface for receiving, as input data, the first history information including the service being provided by the electronic device, environment information at the time when the service is provided, the user's emotional state analyzed on a basis of the user video information at the time when the user requests for the service, a user's preference derivation result at the time of using the service being provided, and a history that the service has been selected from among the recommendation list of the services provided by the electronic device by means of a priority setting based on the user's preference, the second history information including a history that the service provided by the electronic device has been selected or set by a user's manual operation signal, and user's bio-signal information; a learning processor for applying the received input data to a learning model for generating the recommendation list of the services provided by the electronic device according to an analysis result of the user's preferences; and a learning output interface for outputting preference-based service recommendation list data from the learning model, wherein the learning model is learnt so as to generate the recommendation list of the services provided by the electronic device according to the priority setting on a basis of a plurality of pieces of input data which has been already received and the analysis result of the user's preferences that have been already calculated in correspondence to the respective piece of the input data for generating the recommendation list of the services provided by the electronic device.

A preference-based service providing system may include: an electronic device used by a user; a camera for imaging the user; and a server for communicating with the electronic device and the camera, wherein the server acquires user video information obtained by imaging the user who is using the electronic device to analyze preferences of the user for services provided by the electronic device on a basis of the user video information including face images and posture images of the user, and sets priorities of the services provided by the electronic device on a basis of the preferences of the user to provide a list of the services provided by the electronic device on a basis of the priorities.

In addition, in order to implement the present disclosure, there may be further provided other methods, other systems, and a computer-readable recording medium having a computer program stored thereon to execute the methods.

Other aspects, features, and advantages other than those described above will become apparent from the following drawings, claims, and detailed description of the present disclosure.

BRIEF DESCRIPTION OF THE DRAWINGS

The above and other aspects, features, and advantages of the present disclosure will become apparent from the detailed description of the following aspects in conjunction with the accompanying drawings, in which:

FIG. 6 is an exemplary diagram for explaining a preference analysis method of a preference-based service providing system according to an embodiment of the present disclosure;

FIG. 9 is an exemplary diagram for explaining a bio-signal information acquisition method of a preference-based service providing system according to an embodiment of the present disclosure;

DETAILED DESCRIPTION

Figure 1:
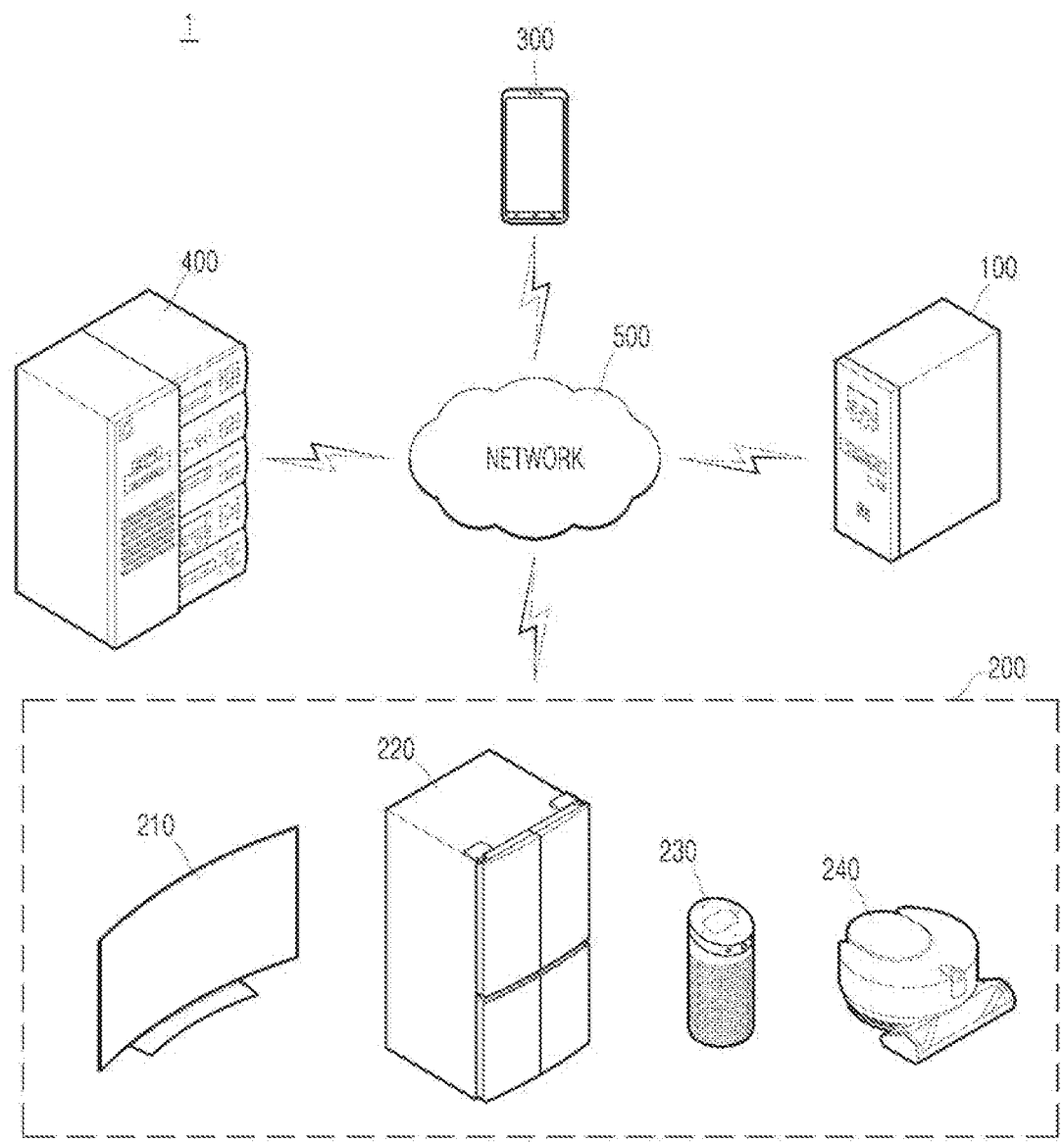
FIG. 1 is an exemplary diagram of a preference-based service providing system environment including a preference-based service providing apparatus according to an embodiment of the present disclosure, an electronic device, a user terminal, a server, and a network for connecting the same to each other.

Advantages and features of the present disclosure and methods for achieving them will become apparent from the descriptions of aspects herein below with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises." "comprising." "including," and "having," are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

FIG. 1 is an exemplary diagram of a preference-based service providing system environment in which a preference-based service providing apparatus according to an embodiment of the present disclosure, an electronic device, a user terminal, a server, and a network for connecting them to each other are included.

With reference to FIG. 1, the environment of a preference-based service providing system 1 may be configured by including a preference-based service providing apparatus 100, an electronic device 200, a user terminal 300, a server 400, and a network 500.

The preference-based service providing apparatus 100 is a device capable of analyzing a user's preference for the electronic device 200 through a camera attached thereto in a prescribed space, for example, a home, a company, a hospital, or the like, and providing a service of the electronic device 200, which is based on the user's preference. In this embodiment, the electronic device 200 may include any one among all electronic devices 200 provided in the prescribed space, and more particularly, may include a terminal in which voice recognition, an artificial intelligence or the like is realizable, a terminal for outputting at least one of an audio signal or a video signal, or the like. For example, the electronic device 200 may include a TV 210, a refrigerator 220, an AI speaker 230, a cleaning robot 240, or the like. In other words, in this embodiment, the preference-based service providing apparatus 100 may be applied to the electronic device 200 so as to provide a service and a service list of the electronic device 200 based on the user's preference. For example, when the preference-based service providing apparatus 100 is applied to the TV 210 in this embodiment and if the user turns on the TV 210, a channel recommendation list may be provided in the order of high priority set on the basis of the user's preference. In addition, when the preference-based service providing apparatus 100 is applied to the AI speaker 230 in this embodiment and if the user utters a wakeup word of the AI speaker 230, a service having the highest priority (for example, a today' weather information providing service, today's air pollution information providing service, or the like) may be provided based on the user's preference. In other words, the services provided by the electronic device 200 may include a service in terms of convenience information that may be provided to the user, and a service in terms of a function of the electronic device 200.

At this point, it is preferable that the preference-based service providing apparatus 100 is to be installed in an upper end side of the electronic device 200, but the present embodiment is not limited thereto, and may be installed at a position at which a user's face image may be easily captured. In this embodiment, the electronic device 200 is limited to the above-described terminal, but the embodiment is not limited thereto and may include various home appliances (for example, a washing machine, a drying machine, a clothing processing apparatus, an air conditioner, a Kimchi refrigerator, or the like). The preference-based service providing apparatus 100 may be applied to any one among all the electronic devices 200 provided in the prescribed space, but, in this embodiment, an embodiment in which the preference-based service providing apparatus 100 is applied to the TV 210 will be explained.

Figure 2:
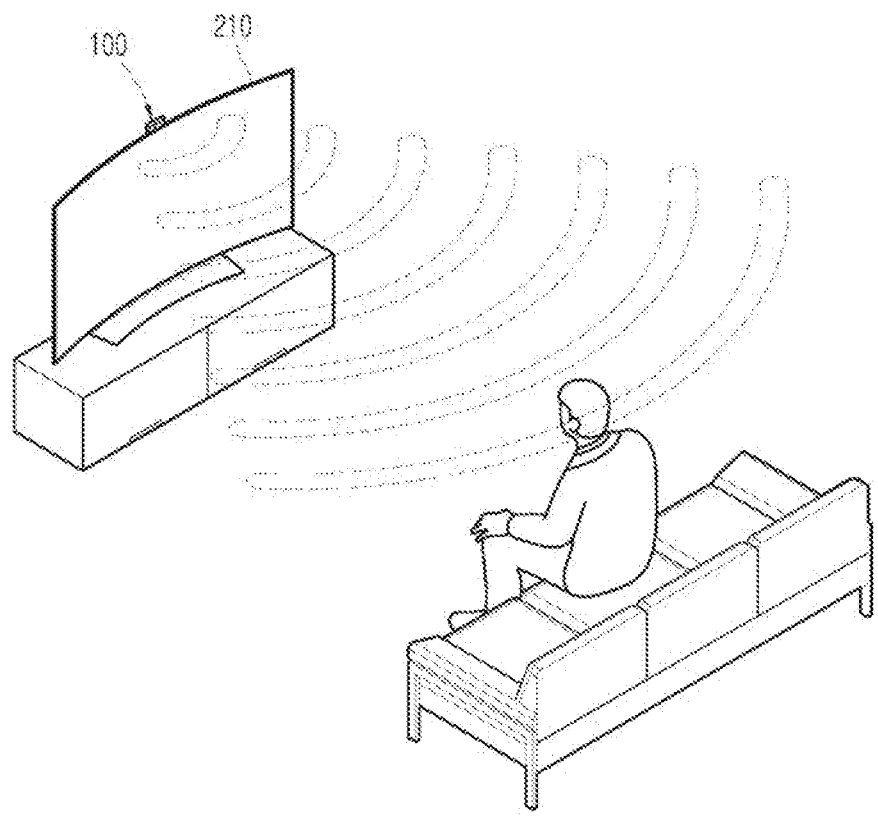
FIG. 2 is a diagram for schematically explaining a preference-based service providing system according to an embodiment of the present disclosure.

FIG. 2 is a diagram for schematically explaining a preference-based service providing system according to an embodiment of the present disclosure. With reference to FIG. 2, in this embodiment, the preference-based service providing apparatus 100 may be installed in an upper end side of the TV 210 to provide a service based on a user's preference analyzed on the basis of user video information obtained by imaging the user who watches the TV 210. On the other hand, in this embodiment, the TV 210 may mean a multimedia device. The multimedia device may be, for example, a network TV to which a computer supporting function is added besides a broadcast reception function, namely, to which an Internet function or the like is added thereto while the broadcast reception function is adhered, and may be equipped with a more convenient interface such as a handwriting-type input device, a touch screen, or a spatial remote controller. In addition, the multimedia device is connected to the Internet or a computer with support of a wired or wireless Internet function and is capable of performing functions of email, web browsing, banking, game, or the like. For such various functions, a standardized general purpose operation system (OS) may be used. Accordingly, in the multimedia device described in this embodiment, various applications may be freely added thereto or removed therefrom on a general purpose OS kernel, and thus various user-friendly functions may be executed.

In this embodiment, the TV 210 may include a broadcast receiver (not shown), an external device interface (not shown), a user input interface (not shown), a wireless communicator (not shown), a display (not shown), an audio output interface (not shown), and a power supply (not shown). Furthermore, the broadcast receiver may include a tuner (not shown), a demodulator (not shown), and a network interface (not shown). The tuner may tune a specific broadcast channel according to a channel selection command, and receive a broadcast signal for the selected specific broadcast channel. In addition, the tuner may receive a video, an audio and data in a frequency band that corresponds to a channel number in response to a user input. In addition, the tuner may receive broadcast signals from various sources such as terrestrial broadcasting, cable broadcasting, satellite broadcasting, or the like. The tuner may also receive broadcast signals from various sources such as analog broadcasting or digital broadcasting. The tuner may be realized in an all-in-one type with the TV 210, or a separate device (for example, a set-top box, or a tuner connected to a port) provided with a tuner unit electrically connected to the TV 210. The tuner may tune and select only a frequency of a channel desired to receive from among many propagation components by performing amplification, mixing, resonance, or the like on a broadcast signal received in a wired or wireless manner. The broadcast signal may include video, audio and additional data (for example, electronic program guide (EEG)).

The demodulator may divide the received broadcast signal into a video signal, an audio signal, and a data signal related to broadcast programs, and recover the divided video signal, audio signal and data signal into types to be output. The external device interface may receive an application or an application list in an adjacent external device, and deliver the same to the TV 210. The external device interface may provide a connection path between the TV 210 and the external device. The external device interface may receive at least one of a video output or an audio output from the external device connected to the TV 210 in a wired or wireless manner, and deliver the same to the TV 210. The external device interface may include a plurality of external input terminals. The plurality of external input terminals may include an RGB terminal, one or more high definition multimedia interface (HDMI) terminals, and a component terminal.

In addition, the video signal of the external device, which is input through the external device interface, may be output through a display. The audio signal of the external device, which is input through the external device interface, may be output through an audio output interface. The external device, which may be connected to the external device interface, may be any one among a set-top box, a blue-ray player, a DVD player, a game machine, a sound bar, a smartphone, a PC, a USB memory, and a home theater, but is not limited thereto. The network interface may provide an interface for connecting the TV 210 to wired/wireless networks including the Internet. The network interface may transmit or receive data to or from other users or other electronic devices through a connected network 500 or another network linked to the connected network 500. In addition, the network interface may connect to a prescribed web page through the connected network 500 or the other network 500 linked to the connected network 500. In other words, the network interface may perform a connection to the predetermined web page through the network to transmit or receive data to or from a corresponding server. In addition, the network interface may receive content or data provided by a content provider or a network operator. In other words, the network interface may receive content such as a movie, advertisement, a game, VOD, or a broadcast signal and information related thereto provided from the content provider or network operator through the network. In addition, the network interface may receive firmware update information or update files provided by the network operator and transmit data to the Internet, content provider, or the network operator.

In this way, in this embodiment, the TV 210 may playback broadcast program content according to the broadcast signal received through a broadcast receiver. In addition, the TV 210 may playback different kinds of content that corresponds to an external signal received from the external device. The external signal may be received through a network interface. In addition, the network interface may receive content and content metadata from the external device. At this point, the content may include at least one of video data, audio data, image data or text data. In addition, the metadata of the content may include at least one of a content type, a number of a channel through which the content is broadcast, a channel name, a content name, a broadcast time, a place introduced in the content, a place at which the content is imaged, at least one cast member appeared in the content, or a music introduced in the content. Furthermore, the metadata of the content may further include at least one of content identification information, data for the TV 210 on which the content is displayed, data for a user who will execute the content, or data for sorting the content in case of being transmitted through a network and information on whether to execute the content.

On the other hand, the preference-based service providing apparatus 100 in this embodiment may receive a service providing request for a control from a user. A method in which the preference-based service providing apparatus 100 receives the service providing request from the user may include a case of receiving a touch (or a button input) signal for a user interface (UI) from the user, a case of receiving a spoken utterance that corresponds to the service request from the user, or the like. At this point, the UI may be included in an input interface 150 (in FIG. 3) or in the user terminal 300. In addition, the reception of the spoken utterance may execute a voice recognition function by means of a separately provided microphone, or may be realized by a voice recognition function of the electronic device 200 in which the preference-based service providing apparatus 100 is installed. In other words, the UI may be realized by a user input interface of the TV 210.

The user terminal 300 may receive a service for operating or controlling the preference-based service providing system 1 through an authentication process after connecting to a preference-based service providing system operating application or preference-based service providing system operating site. The user terminal 300 that has completed the authentication process in this embodiment may operate the preference-based service providing system 1, and control the operation of the preference-based service providing apparatus 100.

In this embodiment, the user terminal 300 may be a desktop computer, a smartphone, a notebook, a tablet PC, a smart TV, a mobile phone, a personal digital assistant (PDA), a laptop computer, a media player, a micro server, a global positioning system (GPS) device, an e-book terminal, a digital broadcast terminal, a navigator, a kiosk, an MP3 player, a digital camera, a home appliance, or a mobile or non-mobile computing device, which is operated by the user, but is not limited thereto. Furthermore, the user terminal 300 may be a wearable terminal equipped with a communication function and a data processing function, such as a watch, glasses, a hair band and a ring. The user terminal 300 is not limited to the above-described, and a web browsing terminal may be adopted without limitation.

The server 400 may be a database server for providing big data necessary for applying various kinds of artificial intelligence (AI) algorithms, and data for operating the preference-based service providing system 1. Besides, the server 400 may include a web server or an application server for enabling an operation of the preference-based service providing system 1 to be remotely controlled using a preference-based service providing system operating application or a preference-based service providing system operating web browser that is installed in the user terminal 300. Here, AI is an area of computer engineering science and information technology in which a method is studied for making a computer mimic intelligent human behaviors such as reasoning, learning, self-improving, and the like.

In addition, the AI does not exist on its own, but is rather directly or indirectly related to a number of other fields of computer science. In recent years, there have been numerous attempts to introduce artificial intelligent elements into various fields of information technology so as to solve problems in the respective fields.

Machine learning is an area of AI and may include a field of study in which a computer is imparted with a capability to learn without being explicitly programmed. More specifically, the machine learning is a technology for investigating and building systems, and algorithms for such systems, which are capable of learning, making predictions, and enhancing their own performance on the basis of experiential data. Machine learning algorithms, rather than only executing rigidly-set static program commands, may be used to take an approach that builds models for deriving predictions and decisions from input data.

Meanwhile, in this embodiment, the preference-based service providing system 1 may include the electronic device 200 used by the user, a camera (may mean a vision camera sensor in FIG. 3) of the preference-based service providing apparatus 100, which images the user, and the server 400 for communicating with the electronic device 200 and the camera. Here, the server 400 may acquire user video information obtained by imaging the user who is using the electronic device 200, and analyze a user's preference for the service provided by the electronic device 200 on the basis of the user video information (a face image and a posture image). In addition, the server 400 may set priorities of the services provided by the electronic device 200 on the basis of the user's preference to provide a recommendation list of the services provided by the electronic device 200 on the basis of the priorities.

In other words, the server 400 may receive and analyze service requesting information from the preference-based service providing system 1, and generate service response information corresponding to the service requesting information to transmit the service response information to the preference-based service providing system 1. In particular, the server 400 may receive from the preference-based service providing apparatus 100 the user video information obtained by imaging the user who is using the electronic device 200, and analyze the user's preferences for the service provided by the electronic device 200. In addition, the server 400 may set the priorities of the services provided by the electronic device 200 on the basis of the user's preferences, and provide the set priorities to the electronic device 200. Furthermore, the server 400 may receive a spoken utterance corresponding to the user's service request from the preference-based service providing system 1, generate a processing result of the spoken utterance as the service response information through voice recognition processing, and provide the service response information to the preference-based service providing system 1. Here, according to the processing capability of the preference-based service providing apparatus 100, the spoken utterance corresponding to the user's service request is recognition-processed and the processing result may also be generated as the service response information in the preference-based service providing apparatus 100.

The network 500 may perform a connection among the preference-based service providing apparatus 100, the electronic device 200, the user terminal 300, and the server 400. Such a network 500 may include a wired network, for example, local area networks LANs), wide area networks (WANs), metropolitan area networks (MANs), integrated service digital networks (ISDNs), or the like, or a wireless network, for example, wireless LANs, CDMA, Bluetooth, satellite communication, or the like, but the scope of the present disclosure is not limited thereto. In addition, the network 500 may transmit and receive information via short range communication and/or long range communication. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 500 may include a connection of network elements such as hubs, bridges, routers, switches, and gateways. The network 500 may include a public network such as the Internet, a private network such as a secure enterprise private network, and one or more interconnected networks, such as a multiple network environment. Access to the network 500 may be provided via one or more wired or wireless access networks. Furthermore, the network 500 may support 5G communication and/or an Internet of things (IoT) network for exchanging and processing information between distributed components such as objects.

Figure 3:
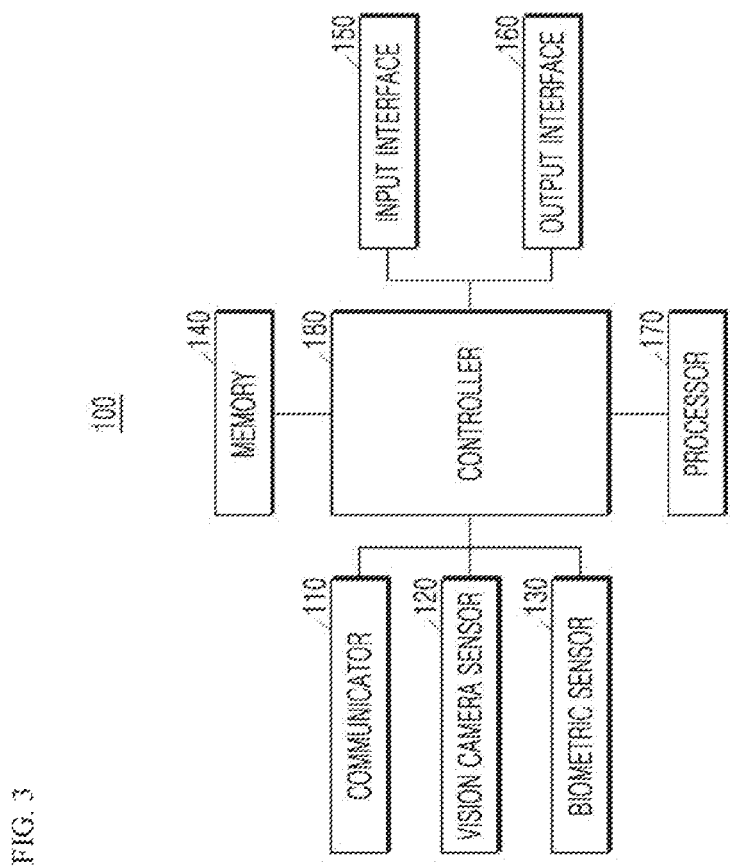
FIG. 3 is a schematic block diagram of a preference-based service providing apparatus according to an embodiment of the present disclosure.

FIG. 3 is a schematic block diagram of the preference-based service providing apparatus according to an embodiment of the present disclosure. In the following description, description of parts overlapping with those of FIGS. 1 and 2 will be omitted.

With reference to FIG. 3, the preference-based service providing apparatus 100 may include a communicator 110, the vision camera sensor 120, a biometric sensor 130, a memory 140, the input interface 150, an output interface 160, a processor 170, and a controller 180.

The communicator 110 may interact with the network 500 to provide a communication interface necessary for providing as a packet data type a transmission/reception signal between the preference-based service providing apparatus 100, the electronic device 200, the user terminal 300 and/or the server 400. Furthermore, the communicator 110 may support a variety of object-to-object intelligent communication, for example, Internet of things (IoT), Internet of everything (IoE), and Internet of small things (IoST), and may support, for example, machine to machine (M2M) communication, vehicle to everything (V2X) communication, and device to device (D2D) communication.

The vision camera sensor 120 may be provided in the electronic device 200 to image the user who is using the electronic device 200. In other words, the vision camera sensor 120 may mean a sensor for enabling a camera and a computer to replace a job performed by a human with his/her eyes. In other words, the computer (or the controller) is enabled to analyze and process the image information obtained from the vision camera sensor 120. However, in this embodiment, the vision camera sensor 120 may include a camera sensor only for performing imaging. In this embodiment, the vision camera sensor 120 may be allowed to image the user who is using the electronic device 200 and extract user characteristic information on the basis of face information extracted from the user video information. Here, in this embodiment, the user may be identified by acquiring the user characteristic information through sensors such as the vision camera sensor 120, the biometric sensor 130 to be described later, and a voice recognition sensor (not shown). For example, in this embodiment, the user may be identified using the user characteristic information such as the face, fingerprint, iris, voice tone, voice magnitude, or the like of the user. A known method may be adopted as a detailed method for identifying the user using the face, voice tone or the like of the user, and detailed explanation thereabout will be omitted.

The biometric sensor 130 senses a bio-signal of the user who is using the electronic device 200 to acquire bio-signal information of the user, and may be included in the electronic device 200 and/or a device (e.g., a remote controller) for controlling the electronic device 200. In addition, the biometric sensor 130 may be provided in the user terminal 300 of a wearable type, which includes, for example, a communication function and a data processing function. The biometric sensor 130 may include sensors for sensing a bio-signal of the user, which include a thermal sensor, a fingerprint sensor, an iris sensor, a pulse sensor, or the like, and is not limited thereto. In this embodiment, the user's preference may be analyzed by reflecting bio-signal information acquired from this biometric sensor 130, and then the user is identified.

The memory 140 may store information for supporting various functions of the preference-based service providing system 1. The memory 140 may store a plurality of application programs or applications driven in the preference-based service providing system 1, pieces of information and instructions for operating the preference-based service providing system 1. At least a part of these application programs may be downloaded from an external server through wireless communication. In addition, the memory 140 may store user information of one or more humans who try to perform interaction with the preference-based service providing system 1. Such user information may include face information and body shape information (for example, obtained by imaging with the vision camera sensor 120), voice information, or the like, which may be used for identifying a recognized user.

In addition the memory 140 stores a wakeup word that can drive the preference-based service providing system 1, and when the user utters the wakeup word, the processor 170 recognizes the same to change an inactive state of the preference-based service providing system 1 into an active state. In addition, the memory 140 may store job information or the like to be performed by the preference-based service providing system 1 in correspondence to a voice command (for example, an instruction or the like for controlling the preference-based service providing system 1) of the user. Furthermore, in this embodiment, the memory 140 may store the entire operation information of the preference-based service providing system 1, the performance information of the electronic device 200, the user characteristic information (for example, face information, voice information, or the like) through which the user is specified, and a service of the electronic device 200, which is to be provided when the user is a specific user. Here, the performance information of the electronic device 200 may include output intensity information, information about the number of channels, various pieces of information indicating driving performance, or the like.

In this embodiment, the memory 140 may perform a function for storing data processed by the processor 170 temporally or permanently. Here, the memory 140 may include a magnetic storage media or a flash storage media, but the scope of the present disclosure is not limited thereto. The memory 140 may include an embedded memory and/or an external memory, and include a volatile memory such as a DRAM, an SRAM, an SDRAM, or the like, a non-volatile memory such as one time programmable ROM (OTPROM), a PROM, a EPROM, an EEPROM, a mask ROM, a flash ROM, a NAND flash memory, a NOR flash memory, or the like, a flash drive such as an SSD, a compact flash (CF) card, an SD card, a Micro-SD card, a Mini-SD card, an XD card, a memory stick, or the like, or storage device such as an HDD.

In this embodiment, the input interface 150 may include all input means, for example, a microphone (not shown) for voice recognition, a user input UI (not shown), and the like, for acquiring information for the preference-based service providing system 1. Under the control of the controller 180, the microphone may receive the spoken utterance uttered by the user toward the preference-based service providing apparatus 100. In addition, in this embodiment, a plurality of microphones may be provided so as to more accurately receive the user's spoken utterance. Here, each of the plurality of microphones may be spaced apart from each other at different positions, and may process the received spoken utterance of the user as an electrical signal. In this embodiment, a voice recognizer (not shown) may be included to perform voice recognition of the spoken utterance of the user, which is received through the microphone. The voice recognizer may use various noise removal algorithms so as to remove a noise generated while receiving the spoken utterance of the user. As a selective embodiment, the voice recognizer may include various components for processing a voice signal, such as a filter (not shown) for removing noise when the spoken utterance of the user is received, and an amplifier (not shown) for amplifying and outputting a signal outputted from the filter. However, as one exemplary embodiment, the microphone is not limited in terms of its position and implementation method, and other input means for inputting an audio signal may be applied without limitation.

The user input UI is a component for receiving information related to overall operations and controls of the preference-based service providing system 1. That is, the UI is a component for providing an interface with the user. Accordingly, in this embodiment, an electronic device service provided by the preference-based service providing system 1 may be selected and set through the input interface 150.

Meanwhile, in this embodiment, the output interface 160 may include all output means, for example, a speaker (not shown), an output UI (not shown), and the like, for outputting information from the preference-based service providing system 1. The speaker may output information related to the operation of the preference-based service providing system 1 as auditory data. In other words, the speaker may output information related to the operation of the preference-based service providing system 1 as audio data. The speaker may output as audio data a notification message such as a warning sound, an operation mode, an operation state, an error state, or the like, information corresponding to a voice command of the user, a processing result corresponding to the user voice command, or the like. In addition, the speaker may convert an electric signal from the controller 180 into an audio signal and output the audio signal. In addition, the speaker may output audio signals (for example, music playback, or the like) from the preference-based service providing apparatus 100 and a device that may communicate in a wired/wireless manner. However, as one exemplary embodiment, the speaker is not limited in terms of its position and implementation method, and may include all output means for outputting an audio signal.

The output UI is a component that may output information related to overall operations and controls of the preference-based service providing system 1. That is, the UI is a component for providing an interface with the user. Accordingly, in this embodiment, an electronic device service of the preference-based service providing system 1 or the like may be output through the output interface 160.

In other words, the UI may include the user input UI and the output UI, and is a component through which information related to the preference-based service providing system 1 is not only input, but also checked. Namely, the UI is a component for providing an interface with the user. In this embodiment, the UI may mean a control panel through which inputting and outputting are enabled for controlling the preference-based service providing system 1. To this end, the UI may be composed of a touch-recognizing display controller or various input and output controllers other than that. As an example, the touch recognition display controller may provide an output interface and an input interface between the device and the user. The touch recognition display controller may transmit and receive electrical signals to and from the controller 180. Also, the touch recognition display controller may display a visual output to the user, and the visual output may include texts, graphics, images, video, and a combination thereof. The UI may be a display member such as an organic light emitting display (OLED) or a liquid crystal display (LCD) or a light emitting display (LED) capable of touch recognition, for example.

In this embodiment, the input interface 150 and the output interface 160 may be realized in the user terminal 300 (in FIG. 1) and/or the electronic device 200 (in FIG. 1). For example, in this embodiment, user inputting, information outputting, or the like may be enabled through a preference-based service providing system operation application or a connection screen of a preference-based service providing system operation site. In addition, the user inputting, information outputting, and the like may be enabled in the electronic device itself.

The processor 170 may acquire user video information (face images and posture images) obtained by imaging the user who is using the electronic device 200 with the preference-based service providing system 1, and analyze user's preferences for service provided by the electronic device 200 on the basis of the user video information. In addition, the processor 170 may set the priorities of the services provided by the electronic device 200 on the basis of the user's preferences, and provide a recommendation list of the services provided by the electronic device 200.

In this embodiment, the processor 170 may be provided outside the controller 180, as shown in FIG. 3, may be provided inside the controller 180 and operate as the controller 180, or may be provided inside the server (400 in FIG. 1). Hereinafter, a detailed operation of the processor 170 will be described with reference to FIG. 4.

The controller 180 is a kind of a central processor, and may drive a control software stored in the memory 140 to control the overall operations of the preference-based service providing system 1. In this embodiment, the controller 180 may image the user who is using the electronic device 200 by means of the vision camera sensor 120, and analyze the user's preferences for the services provided by the electronic device 300 on the basis of the obtained user video information. In addition, the controller 180 may set the priorities of the services provided by the electronic device 200 on the basis of the user's preferences, and provide a recommendation list of the services of the electronic device 200 through the communicator 110 and/or the output interface 160 on the basis of the set priorities. In addition, the controller 180 may acquire bio-signal information of the user who is using the electronic device by means of the biometric sensor 130, and reflect the bio-signal information on the user video information to analyze the user's preferences. Here, the controller 180 may directly receive the preference from the user through the input interface 150. In addition, the controller 180 may receive a selection of a service provided by the electronic device 200 through the input interface 150.

In addition, the controller 180 may include all types of devices capable of processing data like a processor. Here, the term "processor" may refer to a data processing device built in hardware, which includes physically structured circuits in order to perform functions represented as a code or command present in a program. As one example of the data processing device embedded in the hardware, a microprocessor, a central processing unit (CPU), a processor core, a multiprocessor, an application-specific integrated circuit (ASIC), a field programmable gate array (FPGA), and the like may be included, but the scope of the present disclosure is not limited thereto.

The controller 180 in this embodiment may perform machine learning such as deep learning or the like for an extraction of face information (face images and posture images), a user characteristic information extraction, a user's preference analysis, a priority setting, a voice command acquisition, an operation and a user-customized operation of the preference-based service providing system 1 in response to a voice command, or the like. The memory 140 may store data used for the machine learning, result data, or the like.

Deep learning, which is a subfield of machine learning, enables data-based learning through multiple layers. As the number of layers in deep learning increases, the deep learning network may acquire a collection of machine learning algorithms that extract core data from multiple pieces of data.

A deep learning structure may include an artificial neural network (ANN), and the deep learning structure may be composed of a deep neural network, for example, a convolutional neural network (CNN), a recurrent neural network (RNN), a deep belief network (DBN), or the like. The deep learning structure according to the present embodiment may use various structures well known in the art. For example, the deep learning structure according to the present disclosure may include a CNN, an RNN, a DBN, and the like. The RNN is an artificial neural network structure which is formed by building up layers at each instance, and which is heavily used in natural language processing and the like and effective for processing time-series data which vary over a course of time. The DBN includes a deep learning structure formed by stacking up multiple layers of a deep learning scheme, restricted Boltzmann machines (RBM). The DBN has the number of layers formed by repeating RBM training. The CNN includes a model mimicking a human brain function, built under the assumption that when a human recognizes an object, the brain extracts the most basic features of the object and recognizes the object based on the results of complex processing in the brain.

Further, the artificial neural network may be trained by adjusting weights of connections between nodes (if necessary, adjusting bias values as well) so as to produce a desired output from a given input. Also, the artificial neural network can continuously update the weight values through learning. Furthermore, methods such as back propagation may be used in training the artificial neural network.

That is, an artificial neural network may be installed in the preference-based service providing system 1, and the controller 180 may include an artificial neural network, for example, a DNN such as a CNN, an RNN, and a DBN. Accordingly, the controller 180 may train the DNN for the extraction of face information (face images and posture images), the user characteristic information extraction, the user's preference analysis, the priority setting, the voice command acquisition, the operation and the user-customized operation of the preference-based service providing system 1 in response to the voice command, or the like. Machine learning paradigms, in which the ANN operates, may include unsupervised learning and supervised learning. The controller 180 may control so as to update an artificial neural network structure after learning according to a setting.

Figure 4:
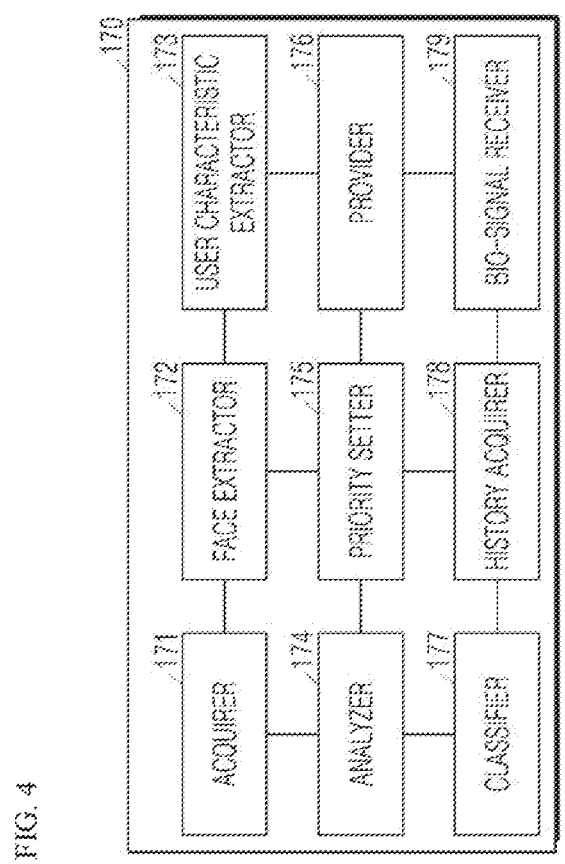
FIG. 4 is a schematic block diagram of a processor in a preference-based service providing apparatus according to an embodiment of the present disclosure in FIG. 3.

FIG. 4 is a schematic block diagram of the processor in the preference-based service providing apparatus according to an embodiment of the present disclosure in FIG. 3. In below, repetitive descriptions about parts identical or corresponding to the embodiments of FIGS. 1 to 3 will be omitted. With reference to FIG. 4, the processor 170 may include an acquirer 171, a face extractor 172, a user characteristic extractor 173, an analyzer 174, a priority setter 175, a provision unit 176, a classifier 177, a history acquirer 178, and a bio-signal receiver 179.

The acquirer 171 may acquire the user video information obtained by imaging the user who is using the electronic device 200 (of FIG. 1). In other words, in this embodiment, the acquirer 171 may acquire the user video information obtained by imaging the user who is using the electronic device through the vision camera sensor 120 (of FIG. 3) installed in the electronic device. Here, the user video information may include face images and posture images of the user, and besides, images obtained by imaging the face, the body, or a gesture of the user who is using the electronic device through the vision camera sensor positioned in the front side of the electronic device. However, the user position from the electron device is not limited thereto. In addition, the user at this time may be an identifiable registered user, or may not be a registered user. When the user is a registered user, the user may be one among a plurality of users, and thus, in this embodiment, one among the plurality of users is identified and user video information thereabout may be acquired.

The face extractor 172 may extract face information from the user video information. In this embodiment, the face extractor 172 may extract the face images and the posture images from the user video information that is acquired by the acquirer and is obtained by imaging the user who is using the electronic device, namely, the user video information obtained by imaging the user by means of the vision camera sensor. Here, the face extractor 172 may extract the face information of the user by applying an object detection algorithm, for example, a face extraction or face recognition algorithm, to the user video information. The object detection is an object identification technology having a process for finding an object instance from a video (or an image). In addition, the object detection may be a subset of object recognition in which when executed through deep learning, not only identifying an object from the image but also comprehending the position are performed. The technology related to the object detection algorithm is well known, and thus a detailed description thereabout will be omitted.

In this embodiment, the face extractor 172 may acquire the user video information who watches the TV 210 (in FIG. 1) in the electronic device to extract a face part from the user video information. Here, when a plurality of people are included in the user video information, the face extractor 172 may identify a face of a registered user to extract only the face information of the corresponding user. For example, the face extractor 172 may extract all the faces of the people from the user video information, compare the extracted face with face information of the users stored in the memory 140 to identify the user, and then only extract the face information of the user. However, in this embodiment, the face extractor 172 may also extract face information of each person from the user video information in which face information of the people is included. Here, the face information may include face size information, position and size information of features (eyes, nose, mouth, and the like) of the face, facial expression information, face direction information, iris size information as information related to the eye, or the like. In addition, as the face information, various kinds of content may be exemplified which include, like the image obtained by imaging the face of the user, the face size information, the position and size information of features of the face, the facial expression information, the face direction information, the information related to the eye, or the like. The face information may include at least one video frame. In addition, the face information may include not only a two-dimensional video but also three-dimensional video information. For the three-dimensional video, the face information may be acquired from a composite apparatus such as a virtual reality apparatus, and in this case, the face information further includes various pieces of additional information such as eyeball recognition, face muscle sensing, voice recognition, a motion mouth operation, body recognition, or the like.

The user characteristic extractor 173 may analyze the face information extracted from the face extractor 172 to extract the user characteristic information including at least one of an emotional state, an attention, or an age and a gender. The user characteristic extractor 173 may apply a classifier for classifying emotion to the face information to analyze the emotional state, apply a face landmark and a vision algorithm thereto to analyze the attention, and may apply a multi-label classifier thereto to analyze the age and the gender. In other words, in this embodiment, the user characteristic extractor 173 may apply an AI solution (for example, emotion, face landmark, skeleton, gender/age, face direction, gaze tracking, or the like) thereto to extract the user characteristic information from the face information. In this embodiment, the user characteristic extractor 173 will be described in detail with reference to FIG. 5.

Figure 5:
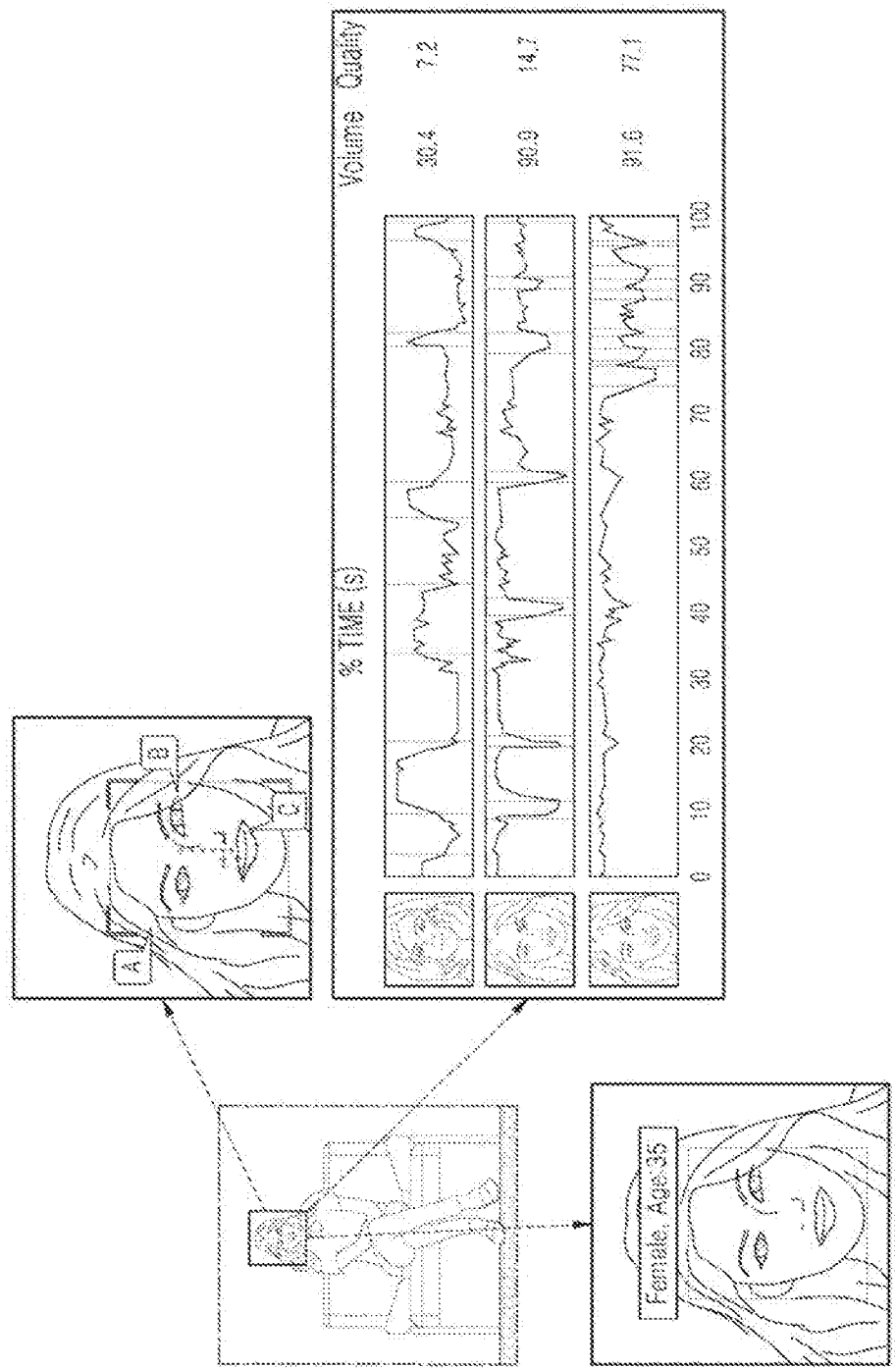
FIG. 5 is an exemplary diagram for explaining a user characteristic information extraction method of a preference-based service providing system according to an embodiment of the present disclosure.

FIG. 5 is an exemplary diagram for explaining a user characteristic information extraction method of a preference-based service providing system according to an embodiment of the present disclosure. With reference to FIG. 5, the user characteristic extractor 173 may extract a face image included in the extracted face information, in particular, facial expression information on the basis of information about the face feature, and estimate a user's emotional state corresponding to the facial expression information. In addition, the user characteristic extractor 173 may estimate the attention for the electronic device (or the service provided by the electronic device) on the basis of a posture image included in the extracted face information, in particular, information about face movement. The user characteristic extractor 173 may also estimate the gender and age from the face information of the user through a learning model for classifying the gender and the age.

Specifically, the user characteristic extractor 173, for example, may analyze the facial expression information on the basis of the facial feature information about an eyebrow (A), an eye (B), a mouth (C), or the like, and, in this embodiment, the analysis may be performed on the basis of reference facial expression information for each emotion category stored in the memory. In other words, the user characteristic extractor 173 may extract, for example, feature points from each of the eyebrow, the eye, and the mouth, analyze the shapes of the eyebrow, the eye, and the mouth through the positions of the feature points, motion vectors of the feature points, and the like, and perform comparison with the reference facial expression information to analyze the facial expression information. For example, when the mouth shape is analyzed to have a feature point corresponding to the position of a mouth corner lifted up, the user characteristic extractor 173 may analyze the facial expression information as a smiling expression (positive expression), and when the mouth shape is analyzed to have the feature point corresponding to the position of the mouth corner lowered down, the user characteristic extractor 173 may analyze the facial expression information as a negative expression. Here, the facial expression information may include, for example, feature point positions and motion vectors of the facial feature information corresponding to the positive expression, feature point positions and motion vectors of the facial feature information corresponding to the negative expression, feature point positions and motion vectors of facial feature information corresponding to a neutral expression, or the like. In addition, the emotion category may include, for example, neutral, happy, sad, angry, contempt, disgust, fear, surprise, or the like. Here, the classification of the facial expression information and the classification of the emotion category are not limited thereto, and may be classified more specifically.

The user characteristic extractor 173 may analyze the attention on the basis of face movement information, for example, the direction of the line of sight, a face direction, an iris size, or the like, and in this embodiment, the analysis may be performed on the basis of a reference face movement index stored in the memory. Here, the reference face movement index may include numerical values indicating attentions respectively corresponding to the iris direction, the iris size, and the face direction. In addition, for example, in this embodiment, when the face direction is 0 degree with respect to the front, the attention may be calculated to 90%, and when the face direction is +15 degrees with respect to the front, the attention may be calculated to 80%. In addition, since people have different eye sizes and iris sizes, the user characteristic extractor 173 may calculate the iris size and the eye size of the user. Since the iris has features of expanding (the size increases) at the time of attention, and contracting (the size decreases) at the time of being distracted, the user characteristic extractor 173 may perceive the numerical value of the attention by means of the iris size. In other words, in this embodiment, the numerical values of the attentions respectively corresponding to, for example, the iris direction, the iris size, and the face direction are put together to calculate the attention. In this embodiment, the attention is indicated with a percentage, but an indication scheme is not limited thereto.

While the user is using the electronic device (for example, a TV), the emotion and the attention of the user may change. For example, when a program being broadcast shows an interesting scene or a heartwarming scene, the user gazes at the front and shows a smile face, and it may be said at this time that the emotion the user feels may correspond to happiness or pleasure and the attention may be high. However, when the program being broadcast shows a boring scene or a provoking scene, the user looks down or looks at side with an expressionless face. It may be said at this time that the emotion the user feels may correspond to boring or anger, and thus the attention may be low. In this way, the emotion and the attention of the user may be comprehended through not only the facial expression, but also various motions of the user or the voice uttered by the user. In other words, in this embodiment, the emotion and the attention of the user may be comprehended by synthetically analyzing the facial expression, the direction of the line of sight, the face direction, or the like, and furthermore, by synthetically analyzing the voice, the light of sight, the eye movement, or the gesture of the user. However, an element for analyzing the emotion and the attention of the user is not limited thereto, and various elements capable of representing the emotion of a human may be included. Here, since the emotion and the attention of the user are not fixed, but change as the time passes, change amounts of the emotion and the attention may appear between a plurality of frames obtained by imaging the user's face that changes according to the content of the program broadcast. In other words, the user characteristic extractor 173 may extract or select the user characteristic information during a preset certain period of time, and then perform an analysis.

FIG. 6 is an exemplary diagram for explaining a preference analysis method of a preference-based service providing system according to an embodiment of the present disclosure. With reference to FIG. 6, the analyzer 174 may analyze the user's preferences for the services provided by the electronic device on the basis of the user video information. In other words, the analyzer 174 may digitize the user characteristic information extracted by the user characteristic extractor 173 and analyze the user's preferences through the digitized result. As described above, since the user characteristic information may change over time, the analyzer 174 in this embodiment may add up average values of respective piece of the user characteristic information during a certain period of time, and derive the added up result of the averages of the respective piece of the user characteristic information as the user's preference. For example, the analyzer 174 may calculate a numerical value for the emotion of the user using confidence derived from a softmax function, and the attention value may be calculated by calculating numerical values of the direction of the line of sight, the face direction, or the like within a range of 0 to 1. In addition, in this embodiment, the gender and age may also be calculated as a numerical value by means of a preset algorithm. Here, the analyzer 174 may impart a weight to each of values of the emotional state, the attention, the gender and the age to add up the weight-imparted values. For example, in this embodiment, weights of 0.5, 0.4, and 0.1 may be respectively imparted to the values of the emotion, the attention, and the gender and age. Accordingly, in this embodiment, the weights may be imparted to the values of the emotion, the attention, and the gender and age, which are extracted according to, for example, the types of content or services provided by the electronic device, and the weight-imparted values are added up to calculate the preference. With reference to FIG. 6, it may be seen that the preference of content type (or service type) C is the highest. Here, the weights imparted to the values of the emotion, the attention, and the gender and age may be changed.

The priority setter 175 may set the priorities of the services provided by the electronic device 200 on the basis of the user's preferences analyzed by the analyzer 174. Here, the priority setter 175 may set the priorities in order of high preference of the user. For example, in this embodiment, when the electronic device 200 is the TV 210, the priority setter 175 may respectively set priorities of programs broadcast on the TV 210 in order of high preference for each piece of content, each genre of content, each type of content, and detailed information on content. In addition, the priority setter 175 may set a priority of a channel itself, namely, broadcast channels on the TV and channel categories or the like in order of high preference. Furthermore, the priority setter 175 may set priorities of content and channels in order of high preference according to a time, weather, a date, a gender and an age. In other words, the priority setter 175 may receive a preference analysis result for all the classifiable service items provided on the TV, and set the priorities in order of high preference, and store the priorities in the memory. In addition, the priority setter 175 may synthetically analyze the stored priorities to set and readjust the priorities.

The provider 176 may provide a list of services provided by the electronic device on the basis of the priorities set by the priority setter 175. In other words, the provider 176 may provide the service list in order of high priority. However, the present disclosure is not limited thereto, and a service having the highest priority may be provided. For example, when the electronic device is the TV, the provider 176 may provide a recommendation channel list on the basis of the priorities to assist the user to rapidly and conveniently select the channel having high preference. Here, the provider 176 may provide a service of the electronic device, which corresponds to the priority, through the output interface 160 (in FIG. 3). For example, the provider 176 may provide the channel corresponding to the priority on a TV screen. Here, when a request for the service provided by the electronic device is received from the user, the provider 176 may provide the service of the electronic device, which corresponds to the priority. For example, when the user turns on the TV or requests for providing a recommendation channel, the provider 176 may recommend to the user the channel on which highly preferable content is being broadcast or a highly preferable channel as a recommendation channel. In other words, the request for the service may include the user's turning on the electronic device, or the user's performing an operation for receiving a recommendation service.

Figure 7:
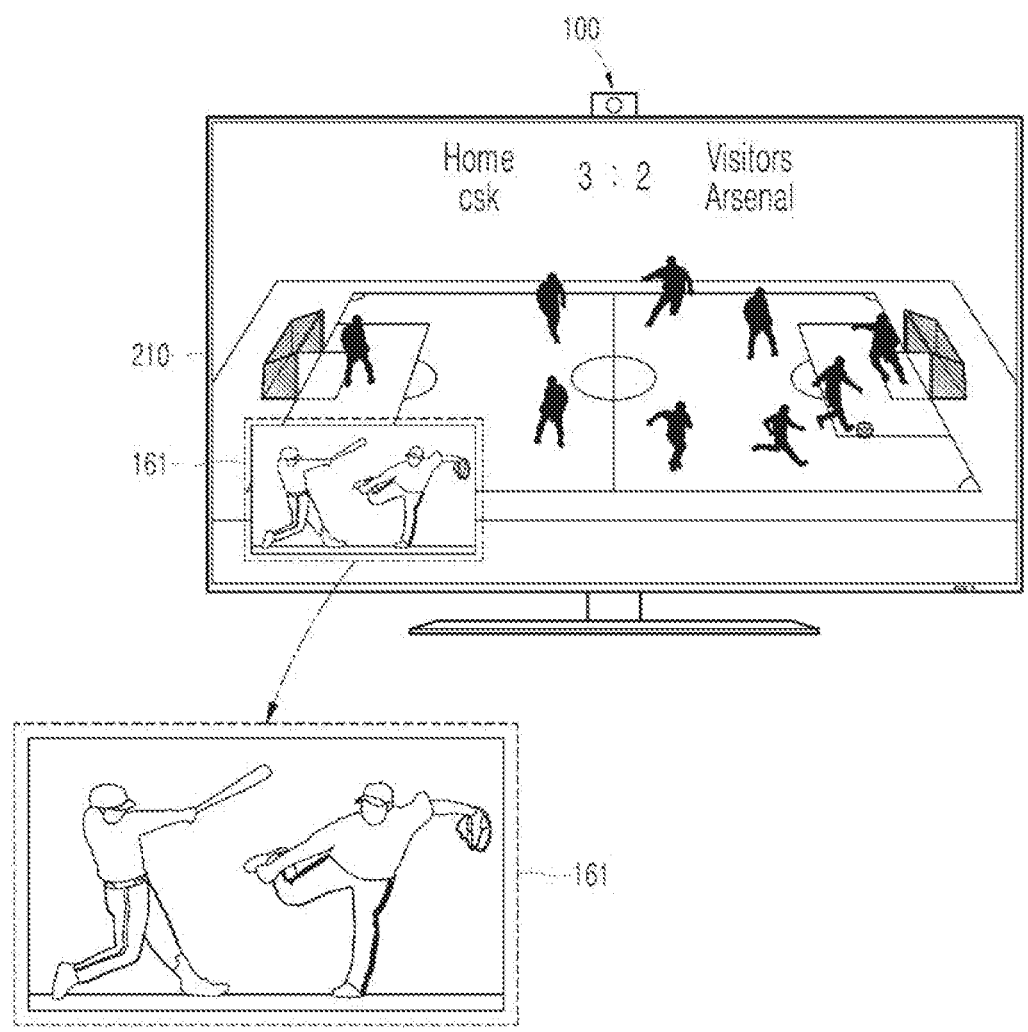
FIGS. 7 and 8 are exemplary diagrams schematically illustrating a service providing screen of a preference-based service providing system according to an embodiment of the present disclosure.
Figure 8:
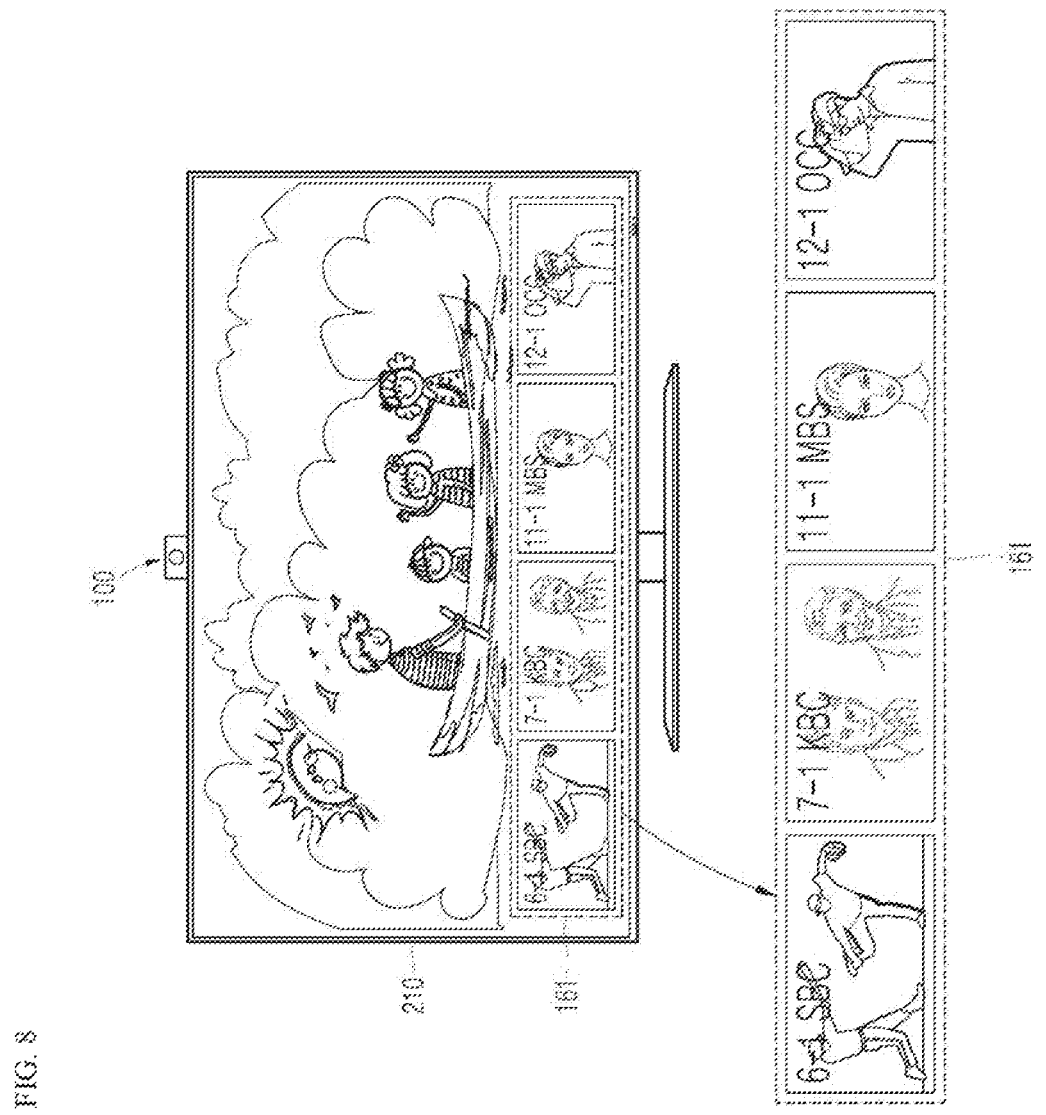

FIGS. 7 and 8 are exemplary diagrams schematically illustrating a service providing screen of the preference-based service providing system according to an embodiment of the present disclosure. With reference to FIGS. 7 and 8, the provider 176 may provide the channel corresponding to the priority through a recommendation channel region 161. As shown in FIG. 7, the provider 176 may provide the highest preferable channel, namely, the channel having a first priority through the recommendation channel region 161. In addition, as shown in FIG. 8, the provider 176 may provide a priority channel list constructed in order of high priority, namely, first to fourth priorities through the recommendation channel region 161. Here, in this embodiment, a channel preview may be provided in the recommendation channel region 161 in a format of a slide show, but the provision format is not limited thereto. In addition, in this embodiment, the number of recommendation channels, which may be provided to the recommendation channel region 161, may be changed according setting. Accordingly, in this embodiment, as shown in FIG. 7, even when the recommendation channel region 161 is formed of one space, the priority channel list may be provided in the slide show format. Meanwhile, when the electronic device is, for example, the AI speaker 230 (in FIG. 1) and the user drives the AI speaker, the provider 176 may execute or recommend the service of a higher priority among services provided by the AI speaker. In this way, in electronic devices other than the TV, the service corresponding to the priority may be directly executed or recommended, and the service may be recommended through a display screen or a voice of the corresponding electronic device.

In this embodiment, in order to respectively set the priorities for content broadcast on the TV, content genre, content type, and other detailed information on content, the classifier 177 may store, in the memory, information on the content broadcast on the TV, the content genre, the content type, and the other detailed information on content, and an analysis result for the preference. In addition, in order to set the priority for a channel itself, namely, broadcast channels on the TV and channel categories, the classifier 177 may store, to memory, information on the channel itself including the broadcast channels on the TV and the channel categories, and an analysis result for the preference. In other words, in this embodiment, the classifier 177 may classify all classifiable service items (content, channels, functions, or the like) provided on not only the TV, but also the electronic device, and an analysis result of the user's preferences for the items, and store the classified result.

In addition, the classifier 177 may store environment information at the time when the service is provided and information on the user' emotion analyzed on the basis of the user video information at the time when the service is requested for. Here, the environment information at the time when the service is provided may include a time, a place, a date, weather, or the like. In other words, in this embodiment, for example, on the basis of the user's emotional state when the user turns on the TV, a channel on which content having been highly preferable is being broadcast is provided as a recommendation channel, when the user is in the corresponding emotional state. In addition, in this embodiment, all pieces of information including emotion information of the user, a time, a place, weather, or the like are reflected so as to set and readjust the priority. In other words, the classifier 177 may synthetically analyze preference analysis results of all the service items to enable the optimal priority setting by classifying the service that is being provided by the electronic device, environment information at the time when the service is provided, user's emotion information analyzed on the basis of the user video information at the time when the service is requested for, and an analysis result for the user's preference at the time when the user uses the service that is being provided, and then by storing the classified result to the memory.

Meanwhile, in the present embodiment, when the electronic device service corresponding to the priority is provided, whether the user selects and/or changes the provision service is checked and the priority may be readjusted by imparting weights to preference result values stored in the memory.

The history acquirer 178 may acquire first history information including a history in which a service has been selected from among the recommendation list of services provided by the electronic device according to a priority setting on the basis of the user's preferences, and second history information including a history in which the service provided by the electronic device has been selected or set by a manual operation of the user. Here, the history acquirer 178 may acquire at least one of a selection or setting accumulation value, a use time accumulation value, of a number of change accumulation value for a service provided by the electronic device, which are included in the first history information and the second history information. Accordingly, in this embodiment, the priority setter 175 may reflect the first history information and the second history information to readjust the priority. For example, the history acquirer 178 may acquire history information including how many times the user has selected and executed the service provided by the electronic device by means of the priority setting based on the user's preference, how long the service has been executed without a change, how many times the user has changed the service provided by the electronic device by means of the priority setting based on the user's preference, or the like. In addition, the history acquirer 178 may acquire information about a manual selection service, when the user does not request for providing the service and manually selects the service, or manually selects the service that is not included in a service list.

Meanwhile, in this embodiment, the preference may be analyzed by means of not only the user video information but also bio-signal information of the user. In other words, the bio-signal receiver 179 of the present embodiment may acquire bio-signal information of the user who is using the electronic device.

FIG. 9 is an exemplary diagram for explaining a bio-signal information acquisition method of a preference-based service providing system according to an embodiment of the present disclosure. With reference to FIG. 9, the bio-signal receiver 179 in this embodiment may acquire bio-signal information on the user from the biometric sensor 130. In this embodiment, the biometric sensor 130 may be provided in the electronic device, for example, the TV 210 and/or an input interface 150 for controlling the TV 210, for example, a remote controller. Here, the input interface 150 may be an input means of the electronic device, which is separately provided from the input interface of the preference-based service providing apparatus 100. In addition, the biometric sensor 130 may be provided in the user terminal of a wearable type, which includes, for example, a communication function and a data processing function. In other words, when the bio-signal receiver 179 acquires the bio-signal information of the user, the analyzer 174 (in FIG. 4) may reflect the bio-signal information to analyze the user's preference. For example, the analyzer 174 senses a pulse in the bio-signal of the user who watches the TV and may analyze that the attention for the program being broadcast on the TV is high, when the pulse of the user is rapid than a reference value. When the pulse of the user is slower than the reference value, the attention for the program may be analyzed to be low. Besides, on the basis of other bio-signal information, the analyzer senses a change in body of the user when the service is provided by the electronic device, reflects the change to analyze the preference, and thus enables the preference to be more accurately analyzed.

On the other hand, in this embodiment, parameters for learning a pre-trained deep neural network may be collected. Here, the parameters for learning the deep neural network may include face recognition data for extracting face information, face image (facial feature information) data for extracting an emotional state in the user characteristic information, posture image (face movement information) data for estimating the attention in the user characteristic information, classification data for estimating a gender and an age in the user characteristic information, user characteristic information data for analyzing the user's preferences, user's preference analysis information data for setting the priorities, history information data, or the like. In addition, the parameters may also include a voice command, data of an operation and a user-customized operation of the preference-based service providing system 1, which correspond to the voice command. However, in this embodiment, the parameters for learning the deep neural network are not limited thereto. Here, in this embodiment, in order to make the elaborate learning model, data actually used by the user may be collected. In other words, in this embodiment, user data may be input by the user through at least one of the input interface 150, the communicator 110, the user terminal 300, or an input means in the electronic device 200. In addition, the preference-based service providing system 1 may store in the server and/or the memory a service provided by the electronic device and the preference or the priority corresponding to the service without an output result of the learning model, when, for example, the user directly inputs and sets the priority corresponding to his/her preference. In other words, in this embodiment, the preference-based service providing system 1 stores to the server data generated while the user uses the electronic device and forms big data, executes deep learning in the server stage to update related parameters in the preference-based service providing system 1 and enable the parameters to be more elaborate. However, in this embodiment, the update may also be performed by executing the deep learning in an edge stage of the preference-based service providing system 1, the preference-based service providing apparatus 100, or the electronic device 200. In other words, in this embodiment, the deep learning parameters under laboratory condition are embedded at the time of an initial release or an initial setting of the preference-based service providing system 1, and the update may be performed through data accumulated as the user uses more and more the preference-based service providing system 1. Accordingly, in this embodiment, the collected data may be labeled to obtain a supervised-learning result, and the supervised-learning result may be stored in the memory in the preference-based service providing system 1 to complete an evolving algorithm. In other words, the preference-based service providing system 1 may collect data for the preference analysis to generate a learning data set, and performs training with the learning data set through a machine learning algorithm to determine a learnt model so as to set the priority. In addition, the preference-based service providing system 1 may collect data actually used by the user, and perform retraining with the data in the server to generate the retrained model. Therefore, in this embodiment, even after the model is determined as the learnt model, data may be continuously collected, a machine learning model is applied so as to perform retraining with the collected data, and thus the performance may be improved with the re-trained model.

Figure 10:
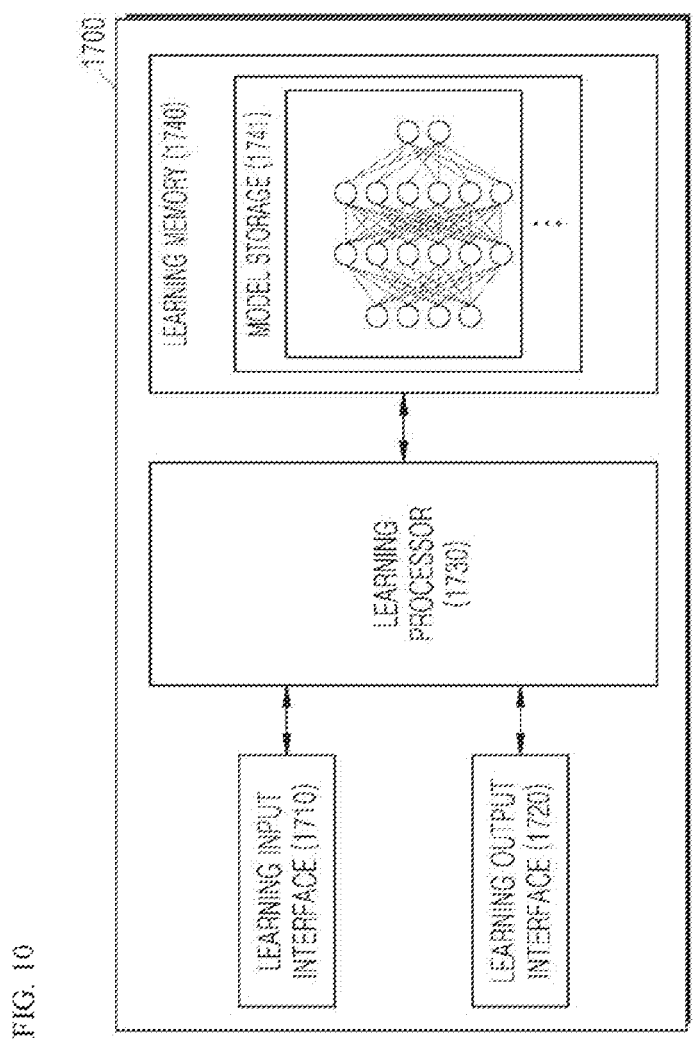
FIG. 10 is a schematic diagram for explaining a learning method of preference-based service providing system according to an embodiment of the present disclosure.

FIG. 10 is a schematic diagram for explaining a learning method of preference-based service providing system according to an embodiment of the present disclosure. In below, repetitive descriptions about parts identical or corresponding to the embodiments of FIGS. 1 to 9 will be omitted.

With reference to FIG. 10, this embodiment may include a learning unit 1700 and the learning unit 1700 may be included in the processor 170, but is not limited thereto. The learning unit 1700 may include a learning input interface 1710, a learning output interface 1720, a learning processor 1730, and a learning memory 1740. The learning unit 1700 may mean an apparatus, a system, or a server for training an artificial neural network using a machine learning algorithm, or using a learnt artificial neural network. Here, the learning unit 1700 may include a plurality of servers to perform distributed processing, and may be defined as a 5G network. Here, the learning unit 1700 is included as a component of the preference-based service providing system 1 to perform at least a part of AI processing.

The learning input interface 1710 may receive as input data the first history information including the service being provided by the electronic device, environment information at the time when the service is provided, a user's emotional state analyzed on the basis of the user video information at the time when the user requests for the service, a user's preference derivation result at the time of using the service being provided, and a history that the service has been selected from the recommendation list of the services provided by the electronic device by means of a priority setting based on the user's preferences, the second history information including a history that the service provided by the electronic device has been selected or set by a user's manual operation signal, and user's bio-signal information.

The learning processor 1703 may apply the received input data to the learning model for generating the recommendation list of the services provided by the electronic device according to an analysis result of the user's preferences. The learning model may be learnt so as to generate the recommendation list of the services provided by the electronic device according to the priority setting on the basis of a plurality of pieces of input data which has been already received and the analysis result of the user's preferences that have been already calculated in correspondence to the respective piece of input data in order to generate the recommendation list of the services provided by the electronic device. In addition, the learning model may include a first deep neural network model pre-trained to estimate an emotional state of a human according to a face image of the human, and a second deep neural network model pre-trained to estimate the attention of the human according to a posture image of the human. Accordingly, in this embodiment, the user's emotional state may be derived on the basis of the face image using the first deep neural network model, and the user's attention may be derived on the basis of the posture image using the second deep neural network. The learning model may be used in a state of being mounted in an AI server of the artificial neural network, or being mounted in an external device.

The learning output interface 1720 may output data for analyzing the preference, which includes user's emotional state data, user's attention data, or the like, from the learning model, and in particular, output preference-based service recommendation list data.

The learning memory 1740 may include a model storage 1741. The model storage 1741 may store a model (or an artificial neural network) being learning or learnt via the learning processor 1730. The learning model may be implemented with hardware, software, or a combination of hardware and software. When a portion or the entirety of the learning model is implemented with software, one or more instructions constituting the learning model may be stored in the learning memory 1740.

Figure 11:
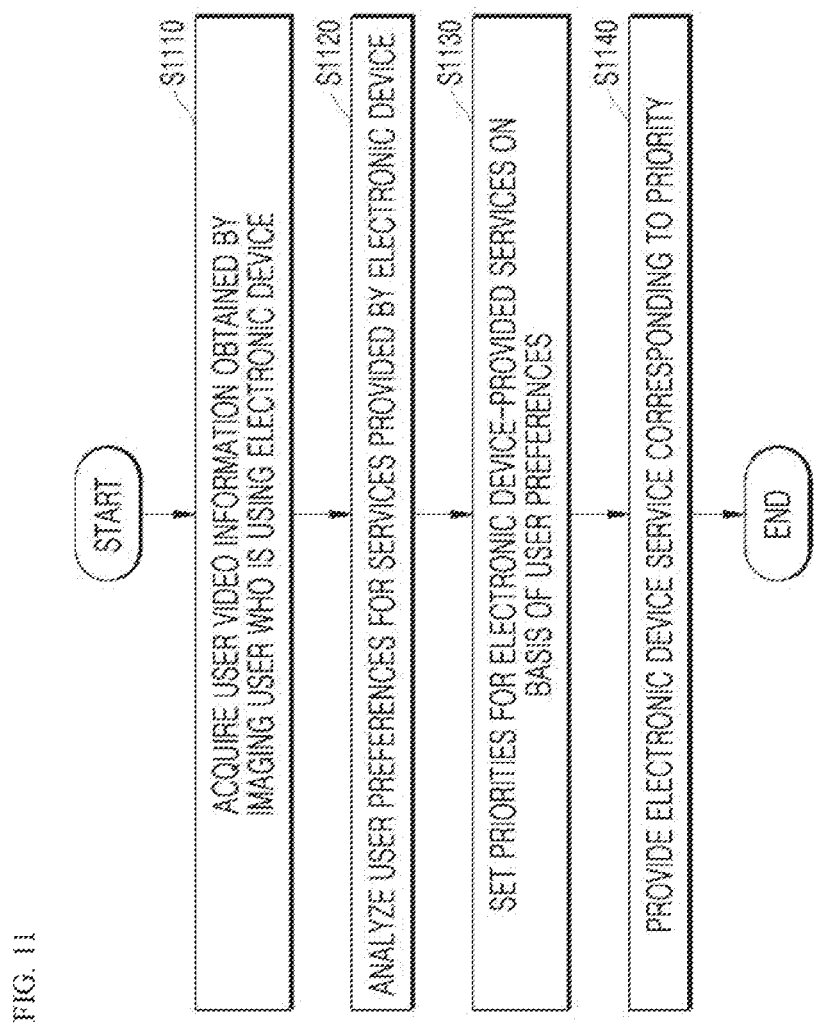
FIG. 11 is a flowchart illustrating a preference-based service providing method according to an embodiment of the present disclosure.

FIG. 11 is a flowchart illustrating a preference-based service providing method according to an embodiment of the present disclosure. In the following description, the description of parts that are the same as those in FIG. 1 to FIG. 10 will be omitted.

With reference to FIG. 1I, in operation SI 110, the preference-based service providing system 1 acquires the user video information obtained by imaging the user who is using the electronic device 200 (in FIG. 1). In other words, in this embodiment, the preference-based service providing system 1 may acquire the user video information obtained by imaging the user who is using the electronic device through the vision camera sensor 120 (in FIG. 3) installed in the electronic device. For example, when the electronic device is a TV, the vision camera sensor may be installed in an upper end side of the TV, and the preference-based service providing system 1 images the user who watches the TV in the front side of the TV to acquire the user video information.

In operation S1120, the preference-based service providing system 1 analyzes user's preferences for services provided by the electronic device. In other words, the preference-based service providing system 1 may analyze the user's preferences for the services provided by the electronic device 200 on the basis of the user video information (face images and posture images) obtained by imaging the user who is using the electronic device. In addition, for example, the preference-based service providing system 1 may extract face information from the user video information on the user who watches the TV, and analyze the extracted face information to calculate the user characteristic information including at least one of the emotional state, the attention, or the age and the gender. In other words, the preference-based service providing system 1 may extract facial expression information on the basis of the face image (facial feature information) included in the face information, and estimate the user's emotional state corresponding to the facial expression information. In addition, the preference-based service providing system 1 may estimate the attention for the electronic device (or the service provided by the electronic device) on the basis of the posture image included in the face information. The preference-based service providing system 1 may also estimate the gender and the age from the user face information through the learning model for gender and age classification. Accordingly, the preference-based service providing system 1 may estimate and digitize the user characteristic information including the user's emotional state, attention, gender and age, and analyze the user's preferences therethrough. Here, since the user characteristic information may change over time, the preference-based service providing system 1 may digitize each piece of the user characteristic information, add up average values of respective piece of the user characteristic information during a certain period of time, and derive the added up result of the averages of the respective piece of the user characteristic information as the user's preference.

In operation S1130, the preference-based service providing system 1 sets the priorities of the services provided by the electronic device on the basis of the user's preferences. Here, the preference-based service providing system 1 may set the priorities in order of high preference of the user. For example, in this embodiment, when the electronic device is a TV, the preference-based service providing system 1 may set the priorities for programs broadcast on the TV in order of high preference for each piece of content, each content genre, each content type, and detailed information on content. In addition, the preference-based service providing system 1 may set the priority of a channel itself such as a broadcast channel on the TV and a channel category or the like in order of high preference. In other words, the preference-based service providing system 1 may receive a preference analysis result for all the classifiable service items provided on the TV to set the priorities in order of high preference, store the priorities in the memory, and synthetically analyze to set the priorities.

In operation S1140, the preference-based service providing system 1 provides the service provided by the electronic device and/or a service recommendation list on the basis of the priorities. For example, when the electronic device is a TV, the preference-based service providing system 1 may provide channels corresponding to the priorities to allow the user to rapidly and conveniently select a highly preferable channel. Here, when the user turns on the TV or performs an operation corresponding to a request for providing a recommendation channel, the preference-based service providing system 1 may provide, as a recommendation channel, a highly preferable channel or a channel on which highly preferable content is being broadcast.

Figure 12:
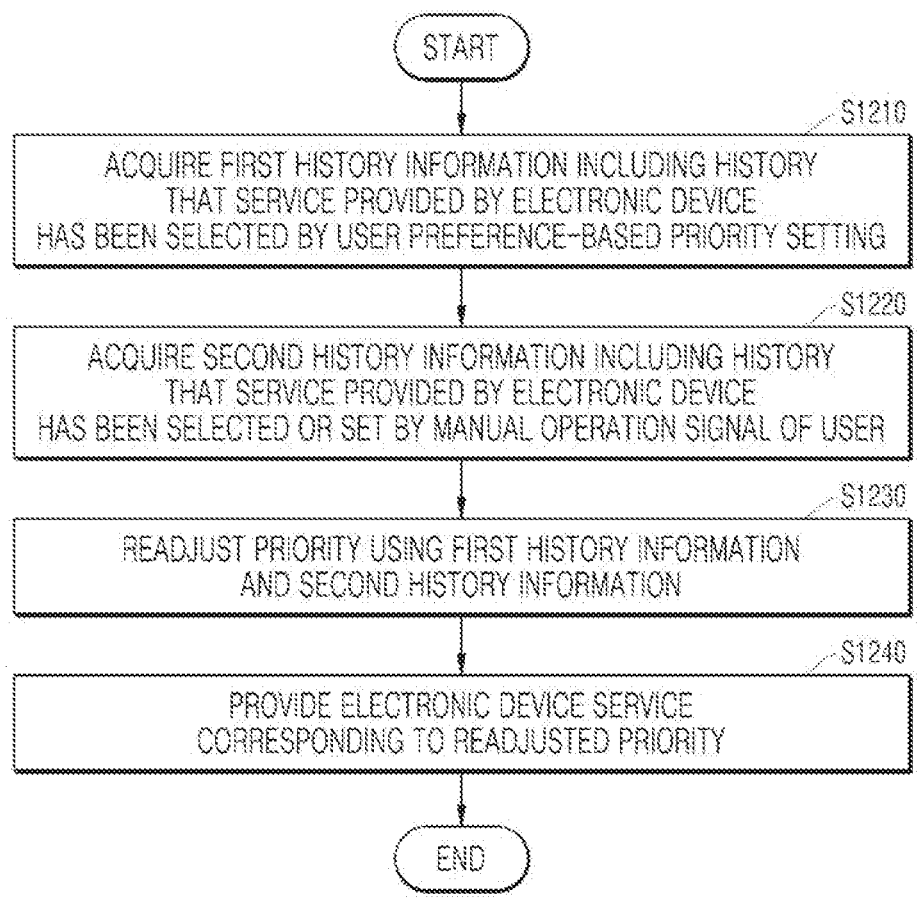
FIG. 12 is a flowchart illustrating a priority readjustment method of a preference-based service providing system according to an embodiment of the present disclosure.

FIG. 12 is a flowchart illustrating a priority readjustment method of a preference-based service providing system according to an embodiment of the present disclosure. In the following description, description of parts overlapping with those of FIGS. 1 to 11 will be omitted.

With reference to FIG. 12, in operation S1210, the preference-based service providing system 1 acquires the first history information including a history that a service has been selected in the recommendation list of the services provided by the electronic device by means of user's preference-based priority setting.

In operation S1220, the preference-based service providing system 1 acquires the second history information including a history that a service provided by the electronic service has been selected or set by means of the user's manual operation signal. Here, the preference-based service providing system 1 may acquire at least one of a selection or setting accumulation value, a use time accumulation value, or a number of change accumulation value for the service provided by the electronic device, which are included in the first history information and the second history information.

In operation S1230, the preference-based service providing system 1 readjusts the priority using the first history information and the second history information. In other words, when the service of the electronic device, which corresponds to the priority, is provided, the preference-based service providing system 1 may check whether the user selects and/or changes the provided service, and impart weights to the preference result values stored in the memory to readjust the priority. Here, the preference-based service providing system 1 may use at least one of the selection or setting accumulation value, the use time accumulation value, or the number of change accumulation value for the service provided by the electronic device, which are included in the first history information and the second history information, and may readjust the priority.

In operation S1240, the preference-based service providing system 1 provides the electronic device service and/or the service recommendation list on the basis of the readjusted priority. In other words, the preference-based service providing system 1 may analyze the preference by means of not only the user video information but also the history information of the user, and enable provision of a user-customized service.

According to embodiments of the present disclosure, a user-customized best service on which actual satisfaction of the user is reflected may be provided by providing an electronic device service based on a user's preference analyzed on the basis face information of the user who uses an electronic device.

In addition, the face information of the user who uses the electronic device is tracked and analyzed to provide a user-customized preference service and thus the performance of the preference-based service providing apparatus may be improved.

In addition, a preference-based service is recommended and provided when power of an electronic device is driven or an electronic device service is requested, and thus inconvenience that the user searches for a desired service every time may be solved.

In addition, the preference-based service providing apparatus is applicable to any electronic device provided with a camera, and thus product utilization and economics thereof may be improved.

In addition, gender and age information is applied to a user's preference analysis so as to set a priority, and thus product reliability of the preference-based service providing apparatus may be improved.

In addition, a user-customized service may be provided in correspondence to user's emotion at the time of requesting a service, and thus a communication performance of the preference-based service providing apparatus may be improved.

In addition, product use satisfaction of the user may be improved by reflecting not only face information of the user but also at least one of history information or bio-signal information so as to set a priority.

In addition, the performance of the preference-based service providing apparatus may be improved by allowing a preference-based priority of services provided by the electronic device to be more accurately set using an artificial intelligence and/or machine learning algorithm.

In addition, the preference-based service providing apparatus itself is a monolithic product massively produced, but since the user recognizes the preference-based service providing apparatus as an individualized apparatus, an effect of a user-customized product may be created.

The effects of the present disclosure are not limited to the effects mentioned above, and other effects not mentioned may be clearly understood by those skilled in the art from the following description.

The embodiments of the present disclosure described above may be implemented through computer programs executable through various components on a computer, and such computer programs may be recorded in computer-readable media. For example, the recording media may include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms "a/an" and "the" include both singular and plural references, unless the context clearly conditions otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A preference-based service providing method, comprising:

Acquiring, by a controller, user video information obtained by imaging a user who is using an electronic device;

analyzing a preference of the user for a service provided by the electronic device on a basis of the user video information comprising a face image and a posture image of the user;

setting a priority of the service provided by the electronic device on a basis of the preference of the user;

providing a recommendation list of services provided by the electronic device on a basis of priorities of the services;

receiving, as input data, the first history information comprising the service being provided by the electronic device, environment information at the time when the service is provided, the user's emotional state analyzed based on the user video information at the time when the user requests for the service, a user's preference derivation result at the time of using the service being provided, a history that the service has been selected from among the recommendation list of the services provided by the electronic device by means of a priority setting based on the user's preference, the second history information comprising a history that the service provided by the electronic device has been selected or set by a user's manual operation signal, and user's bio-signal information;

applying the received input data to a learning model for generating the recommendation list of the services provided by the electronic device according to an analysis result of the user's preferences; and outputting preference-based service recommendation list data from the learning model, wherein the learning model is trained so as to generate the recommendation list of the services provided by the electronic device according to the priorities setting based on a plurality of pieces of input data which has been already received and the analysis result of the user's preferences that have been already calculated in correspondence to the respective piece of the input data for generating the recommendation list of the services provided by the electronic device.

2. The preference-based service providing method of claim 1, wherein the analyzing of the preference of the user comprises:
   extracting the face image and the posture image of the user from the user video information; and
   analyzing the face image and the posture image of the user to extract user characteristic information comprising at least one of an emotions state, an attention, or an age and a gender.

3. The preference-based service providing method of claim 2, wherein the analyzing of the preference of the user comprises:
   digitizing each piece of the user characteristic information;
   adding up an average value of each piece of the user characteristic information during a prescribed time period; and
   deriving a result of adding up the average value of each piece of the user characteristic information as the preference of the user.

4. The preference-based service providing method of claim 1, wherein the analyzing of the preference of the user comprises:
   extracting the face image and the posture image of the user from the user video information;
   using a first deep neural network model to derive the emotional state of the user on a basis of the extracted face image;
   using a second deep neural network model to derive the attention of the user on a basis of the extracted posture image; and
   analyzing the preference of the user on a basis of the derived emotional state and attention of the user,
   wherein the first deep neural network has been already trained so as to estimate an emotional state of a human according to a face image of the human, and the second deep neural network has been already trained so as to estimate an attention of the human according to a posture image of the human.

5. The preference-based service providing method of claim 1, wherein the setting of the priority comprises:
   setting the priority in order of high preference of the user.

6. The preference-based service providing method of claim 1, further comprising:
   receiving a request for the service provided by the electronic device from the user;
   acquiring the user video information obtained by imaging the user at a time of the request; and
   analyzing the emotional state of the user on a basis of the user video information at the time when the service is requested.

7. The preference-based service providing method of claim 1, wherein the setting of the priority comprises:
   acquiring first history information comprising a history that the service is selected from among the recommendation list of the services provided by the electronic device according to the priority setting based on the preference of the user, and second history information comprising a history that the service provided by the electronic device is selected or set by a manual operation of the user; and
   reflecting the first history information and the second history information to readjust the priority.

8. The preference-based service providing method of claim 7, wherein the acquiring of the first history information and the second history information comprises
   acquiring at least one of a selection or setting accumulation value, a use time accumulation value, or a number of change accumulation value for the service provided by the electronic device, which are included in the first history information and the second history information.

9. The preference-based service providing method of claim 1, further comprising: acquiring bio-signal information of the user who is using the electronic device,
   wherein the analyzing of the preference of the user comprises analyzing the preference of the user for the service provided by the electronic device on the basis of the user video information comprising the face image and the posture image of the user, and the bio-signal information of the user.

10. A preference-based service providing apparatus, comprising:
   an acquirer configured to acquire user video information obtained by imaging the user who is using an electronic device;
   an analyzer configured to analyze a preference of the user for a service provided by the electronic device on a basis of the user video information comprising a face image and a posture image of the user;
   a priority setter configured to set a priority of the service provided by the electronic device on a basis of the preference of the user;
   a provider configured to provide a recommendation list of services provided by the electronic device on a basis of priorities of the services;
   a learning input interface configured to receive, as input data, the first history information comprising the service being provided by the electronic device, environment information at the time when the service is provided, the user's emotional state analyzed on a basis of the user video information at the time when the user requests for the service, a user's preference derivation result at the time of using the service being provided, and a history that the service has been selected from among the recommendation list of the services provided by the electronic device by means of a priority setting based on the user's preference, the second history information comprising a history that the service provided by the electronic device has been selected or set by a user's manual operation signal, and user's bio-signal information;
   a learning processor configured to apply the received input data to a learning model for generating the recommendation list of the services provided by the electronic device according to an analysis result of the user's preferences; and
   a learning output interface configured to output preference-based service recommendation list data from the learning model,
   wherein the learning model is learnt so as to generate the recommendation list of the services provided by the electronic device according to the priority setting on a basis of a plurality of pieces of input data which has been already received and the analysis result of the user's preferences that have been already calculated in correspondence to the respective piece of the input data for generating the recommendation list of the services provided by the electronic device.

11. The preference-based service providing apparatus of claim 10, further comprising:
- a face extractor configured to extract the face image and the posture image of the user from the user video information; and
- a user characteristic extractor configured to analyze the face image and the posture image of the user to extract user characteristic information comprising at least one of an emotional state, an attention, or an age and a gender.

12. The preference-based service providing apparatus of claim 11, wherein the analyzer digitizes each piece of the user characteristic information to add up an average value of each piece of the user characteristic information during a certain period of time, and derives the added up result of the average of each of the user characteristic information as the preference of the user.

13. The preference-based service providing apparatus of claim 10, wherein the priority setter sets the priority in order of high preference of the user.

14. The preference-based service providing apparatus of claim 10, wherein when a request for the service provided by the electronic device is received from the user, the acquirer the user video information obtained by imaging the user at the time of the request, and the analyzer analyzes an emotional state of the user on a basis of the user video information at the time when the service is requested.

15. The preference-based service providing apparatus of claim 10, further comprising:
- a history acquirer configured to acquire the first history information comprising a history that the service is selected from among the recommendation list of the services provided by the electronic device according to the priority setting based on the preferences of the user, and the second history information comprising a history that the service provided by the electronic device is selected or set by a manual operation of the user,
- wherein the priority setter reflects the first history information and the second history information to readjust the priorities.

16. The preference-based service providing apparatus of claim 15, wherein the history acquirer acquires at least one of a selection or setting accumulation value, a use time accumulation value, or a number of change accumulation value for the service provided by the electronic device, which are included in the first history information and the second history information.

17. The preference-based service providing apparatus of claim 10, further comprising:
- a bio-signal receiver configured to acquire bio-signal information on the user who is using the electronic device,
- wherein the analyzer analyzes the preference of the user for the service provided by the electronic device on the basis of the user video information comprising the face image and the posture image of the user, and the bio-signal information on the user.

18. A preference-based service providing system, comprising:
- an electronic device used by a user;
- a camera configured to image the user; and
- a server configured to:
  - communicate with the electronic device and the camera,
  - receive, as input data, the first history information comprising the service being provided by the electronic device, environment information at the time when the service is provided, the user's emotional state analyzed on a basis of the user video information at the time when the user requests for the service, a user's preference derivation result at the time of using the service being provided, and a history that the service has been selected from among the recommendation list of the services provided by the electronic device by means of a priority setting based on the user's preference, the second history information comprising a history that the service provided by the electronic device has been selected or set by a user's manual operation signal, and user's bio-signal information,
  - apply the received input data to a learning model for generating the recommendation list of the services provided by the electronic device according to an analysis result of the user's preferences, and
  - output preference-based service recommendation list data from the learning model,
- wherein the learning model is learnt so as to generate the recommendation list of the services provided by the electronic device according to the priority setting on a basis of a plurality of pieces of input data which has been already received and the analysis result of the user's preferences that have been already calculated in correspondence to the respective piece of the input data for generating the recommendation list of the services provided by the electronic device, and
- wherein the server acquires user video information obtained by imaging the user who is using the electronic device to analyze preferences of the user for services provided by the electronic device on a basis of the user video information comprising face images and posture images of the user, and sets priorities of the services provided by the electronic device on a basis of the preferences of the user to provide a list of the services provided by the electronic device on a basis of the priorities.

* * * * *